(12) United States Patent
Aono et al.

(10) Patent No.: US 8,606,863 B2
(45) Date of Patent: Dec. 10, 2013

(54) MOBILE TERMINAL

(75) Inventors: Tomotake Aono, Yokohama (JP); Junichi Ujii, Yokohama (JP); Tetsuya Takenaka, Yokohama (JP)

(73) Assignee: Kyocera Corporation, Kyoto (JP)

( * ) Notice: Subject to any disclaimer, the term of this patent is extended or adjusted under 35 U.S.C. 154(b) by 469 days.

(21) Appl. No.: 12/680,536

(22) PCT Filed: Sep. 26, 2008

(86) PCT No.: PCT/JP2008/067419
§ 371 (c)(1),
(2), (4) Date: Jun. 3, 2010

(87) PCT Pub. No.: WO2009/041576
PCT Pub. Date: Apr. 2, 2009

(65) Prior Publication Data
US 2010/0241714 A1  Sep. 23, 2010

(30) Foreign Application Priority Data

Sep. 28, 2007 (JP) ................... 2007-256431

(51) Int. Cl.
*G06F 15/16* (2006.01)
(52) U.S. Cl.
USPC ............ 709/206; 709/201; 709/204; 709/205
(58) Field of Classification Search
USPC ........... 709/201, 204–205, 206; 455/456.1–6, 455/412.1, 420
See application file for complete search history.

(56) References Cited

U.S. PATENT DOCUMENTS

| | | | |
|---|---|---|---|
| 5,546,092 A | 8/1996 | Kurokawa et al. | |
| 7,203,502 B2* | 4/2007 | Wilson et al. | 455/456.2 |
| 7,532,900 B2* | 5/2009 | Wilson et al. | 455/456.3 |
| 7,742,774 B2* | 6/2010 | Oh et al. | 455/456.1 |
| 7,877,103 B2* | 1/2011 | Graham et al. | 455/466 |
| 8,166,139 B2* | 4/2012 | Engstrom et al. | 709/221 |
| 2005/0221802 A1* | 10/2005 | Hosono | 455/412.1 |

(Continued)

FOREIGN PATENT DOCUMENTS

| | | |
|---|---|---|
| JP | 10-341476 | 12/1998 |
| JP | 2002-082890 | 3/2002 |

(Continued)

OTHER PUBLICATIONS

Office Action from Korean Patent Application No. 10-2010-7006701, mailed on Jun. 8, 2011.

(Continued)

*Primary Examiner* — Wing F Chan
*Assistant Examiner* — Benjamin M Thieu
(74) *Attorney, Agent, or Firm* — Duane Morris LLP

(57) ABSTRACT

The mobile terminal 10 includes a transmission unit 20 for transmitting an e-mail, a location information acquisition unit 22 and 20 for acquiring the location information of the mobile terminal and a control unit 26 for controlling, at the time of transmission processing of the e-mail, when a predetermined special character is included in the e-mail to be transmitted, so that the location information acquisition unit 20 and 22 acquires the location information of the mobile terminal, and the acquired location information is added to the e-mail to be transmitted by being associated with the special character and the added e-mail is transmitted by the transmission unit 20.

22 Claims, 23 Drawing Sheets

(56) References Cited

U.S. PATENT DOCUMENTS

| | | | | |
|---|---|---|---|---|
| 2006/0223518 A1* | 10/2006 | Haney | ............................ | 455/420 |
| 2007/0143401 A1* | 6/2007 | Lance et al. | ................... | 709/204 |
| 2008/0182598 A1* | 7/2008 | Bowman | ........................ | 455/466 |

FOREIGN PATENT DOCUMENTS

| | | |
|---|---|---|
| JP | 2002-262338 | 9/2002 |
| JP | 2003-114137 | 4/2003 |
| JP | 2003-228532 | 8/2003 |
| JP | 2005-208795 | 8/2005 |
| JP | 2005-275750 | 10/2005 |
| JP | 2005-285047 | 10/2005 |
| JP | 2006-252446 | 9/2006 |

OTHER PUBLICATIONS

Gendt and Dick, (eds.), "Special Topics and New Directions" Workshop Proceedings Potsdam, May 15-18, 1995, published by the GeoForschungsZentrum Potsdam, Germany.

Notice of Final Rejection for Korean Patent Application No. 10-2010-7006701, mailed Nov. 29, 2011, 6 pages (including English language translation).

International Search Report for PCT/JP2008/067419, mailed on Nov. 11, 2008, 2 pages.

JP2007-256431 Notification of Reason for Refusal mailed Sep. 4, 2012.

* cited by examiner

FIG. 10
(a) 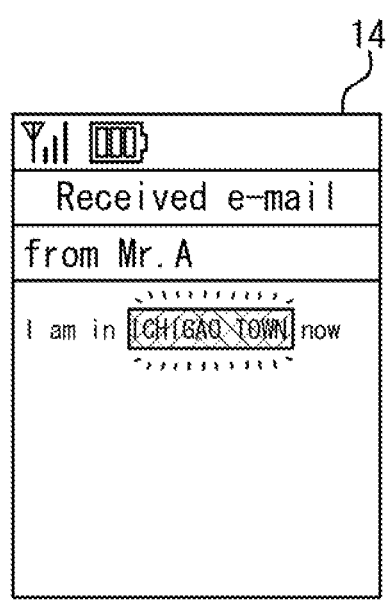
(b) 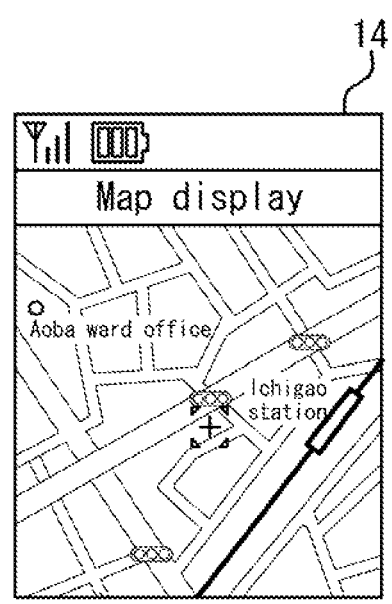

FIG. 13

FIG. 18

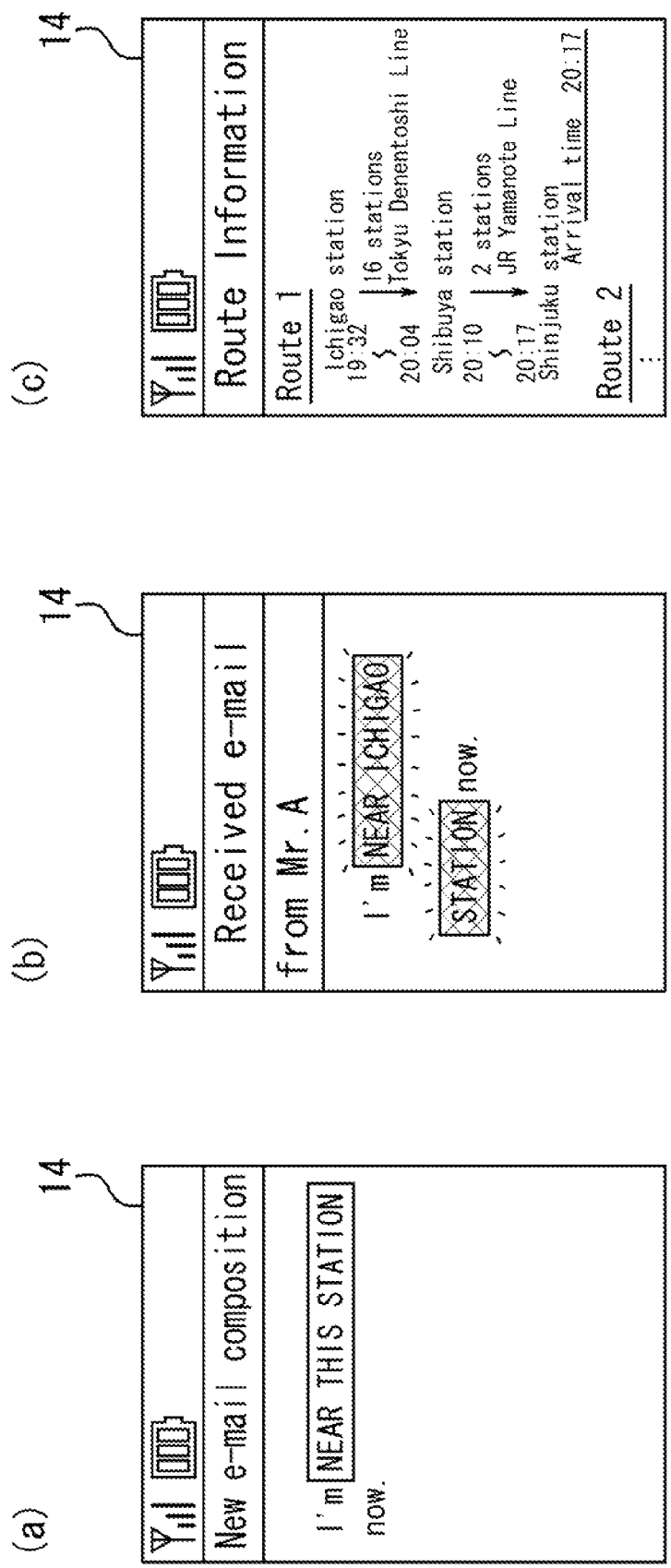

MOBILE TERMINAL

CROSS REFERENCE TO RELATED APPLICATIONS

This application is a U.S. national phase application of International Application No. PCT/JP2008/067419 filed Sep. 26, 2008, which claims priority to and the benefit of Japanese Patent Application No. 2007-256431 filed on Sep. 28, 2007. The contents of these applications are herein incorporated by reference in their entirety.

TECHNICAL FIELD

The present invention relates to mobile terminals and, in particular, to mobile terminals capable of transmitting and receiving e-mails.

BACKGROUND ART

In recent years, mobile terminals including cellular phones are widely and commonly used, and the number of users has been increasing. In particular, recently, exchanges of messages through transmission/reception of e-mails by use of mobile terminals such as a cellular phone and PDA are widely and routinely performed. Moreover, mobile terminals are equipped with various function units and applications such as a digital camera, GPS and non-contact IC card function, thereby offering an increasing range of functions. Thus convenience of users has been improved dramatically.

In Japan, due to a revision of the Ordinance of the Ministry of Internal Affairs and Communications (Regulations for Telecommunications Facilities for Telecommunications Business), the 3G (third generation) cellular phone terminals released on and after April 2007 are required to have a function for notifying the departments concerned of the location information of the terminal at the time of transmission of an emergency message. Consequently, it seems that, among the functions incorporated in the mobile terminals, in particularly, a GPS (Global Positioning System) will become more common. The same trend has occurred outside Japan such as US and Europe, and it is expected that mobile terminals provided with the GPS will be widely used all over the world in the future. With respect to such mobile terminals provided with a navigation function by the GPS, various terminals have been suggested, and one example is described in Japanese Patent Application Laid-Open No. 10-341476.

The cellular phone described in the Japanese Patent Application Laid-Open No. 10-341476 can, as a normal cellular phone, communicate with another cellular phone by radio and, in addition display the present location obtained by a GPS reception unit and a GPS image data generation routine on a liquid crystal display by a map, whereby the user of the cellular phone can know his/her present location almost exactly.

The user who moves with such a cellular phone may use the GPS function as an effective guide. Thus the user can significantly reduce a risk that he/she may get lost and cannot reach the destination even if an unknown place where the user visits for the first time is designated as a meeting place.

However, the intended use of the normal GPS is to obtain the location information of terminal itself. Therefore, with the cellular phone described in Japanese Patent Application Laid-Open No. 10-341476, it is possible to know only the present location of the terminal itself. Thus it is impossible to know the present location of a terminal of the corresponding party to meet.

When the user wants to know the present location of the terminal of the corresponding party, for example, if the corresponding party carries a cellular phone, it is possible to get the present location of the corresponding party through wireless communications or e-mails with the corresponding party. However, if the user asks the corresponding party to explain the present location on the wireless phone, it could be a considerable burden to the corresponding party. In some cases, it may be difficult for the corresponding party to talk or explain on the phone. In addition, it is also time-consuming for the corresponding party to explain the present location by e-mail, and further, there may be some cases where the corresponding party cannot describe the present location well by the textual information. If the corresponding party is a stranger in the present location, the corresponding party may not have any idea about his/her present location.

In order to deal with such problem, for example, there is a mobile terminal disclosed Japanese Patent Application Laid-Open No. 2002-262338. According to this, each of a user and a corresponding party carries a mobile terminal provided with a GPS function, and the mobile terminals obtain their location information respectively from a GPS satellite. Then the user can obtain the location information of the corresponding party from the location information service center by use of his/her mobile terminal and, in addition can obtain the map information from the map information database.

The mobile communication terminal described in the Japanese Patent Application Laid-Open No. 2002-262338, enables the user to obtain the present location information of the mobile terminal of the corresponding party with the present location information of his/her mobile terminal using his/her mobile terminal. Moreover, it is possible to display not only the user's location but also the corresponding party's location on a map displayed on the display unit of user's mobile terminal. Thus the present location of the corresponding party can be specified easily, which enables the user to recognize easily the relationship of the locations between him/her and the corresponding party.

SUMMARY OF INVENTION

Technical Problems

However, the technique described in Japanese Patent Application Laid-Open No. 2002-262338 enables the user only to know his/her present location and the corresponding party's present location. That is, it is a technique for the user to know the relationship of the locations between him/her and the corresponding party. Therefore, the corresponding party can also obtain the user's location by using this technique. However, the user cannot transmit his/her location to the corresponding party. In particular, in the case where the user seems to be late to meet with someone (or the user is late already) and the like, the user may wish to transmit his/her present location and the expected arrival time based thereon by himself to the corresponding party as accurately as possible, thereby removing anxiety of the corresponding party who will be waiting for the user (or already is waiting) and reducing waste of time for waiting. In this case, the technique described in the Japanese Patent Application Laid-Open No. 2002-262338 cannot be used directly.

Even under such circumstances, as mentioned above, it is not impossible for the user to transmit his/her present location to the corresponding party through wireless communication or e-mail. However, in that case, the aforementioned labors and difficulties will be involved.

In addition, when the user is on a train, the user may refrain from talking on a cellular phone. Further, when the user uses an e-mail, if the user is traveling at a high speed on a train or by a car, since the user is traveling at a high speed even during input of the textual information of the present location in the e-mail to convey the present location, at the time of transmission of the e-mail, there may be significant difference between the actual present location and the present location written on the e-mail.

Therefore, an object of the present invention in view of such circumstances is to provide a mobile terminal which enables a user to inform the corresponding party of his/her present location rapidly through simple operation by transmitting an e-mail and a mobile terminal capable of receiving a present location of an e-mail sender and recognizably displaying the location information.

Solutions to Problems

In order to achieve the above object, the invention of a mobile terminal in accordance with a first aspect includes:
 a transmission unit for transmitting an e-mail;
 a location information acquisition unit for acquiring location information of the mobile terminal; and
 a control unit for controlling so that, when an e-mail to be transmitted includes a predetermined special character at transmission processing of the e-mail, the location information acquisition unit acquires the location information of the mobile terminal, and the acquired location information is added to the e-mail to be transmitted by being associated with the special character and the added e-mail is transmitted by the transmission unit.

In accordance with a second aspect of the present invention, in the mobile terminal in accordance with the first aspect,
 when the predetermined special character is included at encoding of data of an e-mail to be transmitted, the control unit controls the location information acquisition unit to acquire the location information of the mobile terminal.

In accordance with a third aspect of the present invention, in the mobile terminal in accordance with the first or second aspect,
 the control unit controls the location information acquisition unit to acquire, as the location information, information on an address of a location of the mobile terminal.

In accordance with a fourth aspect of the present invention, in the mobile terminal in accordance with the first or second aspect,
 the control unit controls the location information acquisition unit to acquire, as the location information, information on a nearest landmark to a location of the mobile terminal.

In accordance with a fifth aspect of the present invention, in the mobile terminal in accordance with the first or second aspect,
 the control unit controls the location information acquisition unit to acquire, as the location information, information on a nearest station to a location of the mobile terminal.

Further, in order to achieve the above object, the invention of a mobile terminal in accordance with a sixth aspect includes:
 a reception unit for receiving an e-mail;
 a display unit for displaying the e-mail received by the reception unit;
 a storage unit for storing, with the e-mail, location information of a transmission side terminal of the e-mail that is added by being associated with a predetermined special character included in the e-mail; and
 a control unit for controlling the display unit to display information based on the location information of the transmission side terminal stored in the storage unit when displaying the e-mail.

In accordance with a seventh aspect of the present invention, in the mobile terminal in accordance with the sixth aspect,
 the control unit controls the display unit to display the location information of the transmission side terminal when the predetermined special character displayed on the display unit is selected.

In accordance with an eighth aspect of the present invention, in the mobile terminal in accordance with the sixth aspect,
 the control unit controls so that the special character is converted to the location information of the transmission side terminal and the location information is displayed.

In accordance with a ninth aspect of the present invention, in the mobile terminal in accordance with the eighth aspect,
 when the location information of the transmission side terminal is address information, the control unit controls so that the special character is converted to a part of the address information and the part of the address information is displayed.

In accordance with a tenth aspect of the present invention, the mobile terminal in accordance with the ninth aspect further includes
 a location information acquisition unit for acquiring location information of the mobile terminal,
 wherein the control unit controls display of the address information of the transmission side terminal depending on the location information of the mobile terminal acquired by the location information acquisition unit and the address information of the transmission side terminal.

In accordance with an eleventh aspect of the present invention, the mobile terminal in accordance with any one of the sixth to tenth aspects further includes
 a map information acquisition unit for acquiring map information corresponding to location information,
 wherein the control unit, in response to an input to select and determine the predetermined special character displayed on the display unit, controls the map information acquisition unit to acquire map information corresponding to the location information of the transmission side terminal and the display unit to display the acquired map information.

In accordance with a twelfth aspect of the present invention, the mobile terminal in accordance with the eleventh aspect further includes
 a location information acquisition unit for acquiring location information of the mobile terminal, wherein
 the control unit controls acquisition of the map information by the map information acquisition unit so that a map having a scale depending on the location information of the mobile terminal acquired by the location information acquisition unit and the address information of the transmission side terminal is displayed.

Moreover, in order to achieve the above object, the invention of a mobile terminal in accordance with a thirteenth aspect includes,
 a reception unit for receiving an e-mail;
 a display unit for displaying the e-mail received by the reception unit;
 a location information acquisition unit for acquiring location information of the mobile terminal;
 a route information acquisition unit;
 a storage unit for storing, with the e-mail, a first information on a nearest station to a location of a transmission side terminal that is added by being associated with a predetermined special character included in the e-mail; and a control unit for controlling the display unit to display the predetermined special character in a selectable manner, when displaying the e-mail, wherein the control unit controls, in response to an input to select the predetermined special character, the location information acquisition unit to acquire a second information on a nearest station to a present location of the mobile terminal, and controls the route information acquisition unit to acquire route information based on the second information acquired and the first information, and the display unit to display the route information.

In accordance with a fourteenth aspect of the present invention, in the mobile terminal in accordance with the thirteenth aspect, the control unit controls, when the predetermined special character displayed on the display unit is selected, the display unit to display the first information.

In accordance with a fifteenth aspect of the present invention, in the mobile terminal in accordance with the thirteenth aspect, the control unit controls so that the first information is displayed as the special character.

BRIEF DESCRIPTION OF DRAWINGS

FIG. 10 is a diagram showing an example of display on a screen of a display unit of the reception side terminal in accordance with the second embodiment;

FIG. 13 is a diagram showing examples of display on a screen of a display unit of the reception side terminal in accordance with the alternative of the second embodiment;

FIG. 18 is a diagram showing examples of display on a screen of a display unit of transmission side and reception side terminals in accordance with the fourth embodiment;

FIG. 23 is a diagram showing examples of display on a screen of a display unit of transmission side and the reception side terminals in accordance with the sixth embodiment.

DESCRIPTION OF THE PREFERRED EMBODIMENTS

The embodiments of the present invention will now be described below with reference to the drawings. In each of the embodiments described below, a cellular phone is taken as an example of a mobile terminal of the present invention. However, the mobile terminal of the present invention is not limited to a cellular phone but is applicable to any mobile communication terminal such as, for example, a PDA and the like. Further, in the following explanation, a terminal that transmits its location information to a corresponding party is referred to as a "transmission side" terminal and a terminal that receives the transmitted location information and displays it is referred to as a "reception side" terminal. However, in each embodiment of the present invention, two cellular phones 10 having the same specifications can be used. Since one of them can be a transmission side terminal and the other can be a reception side terminal, explanation is given on the assumption that cellular phones 10 having the same specifications are used both on the transmission and the reception sides.

(First Embodiment)

Figure 1:
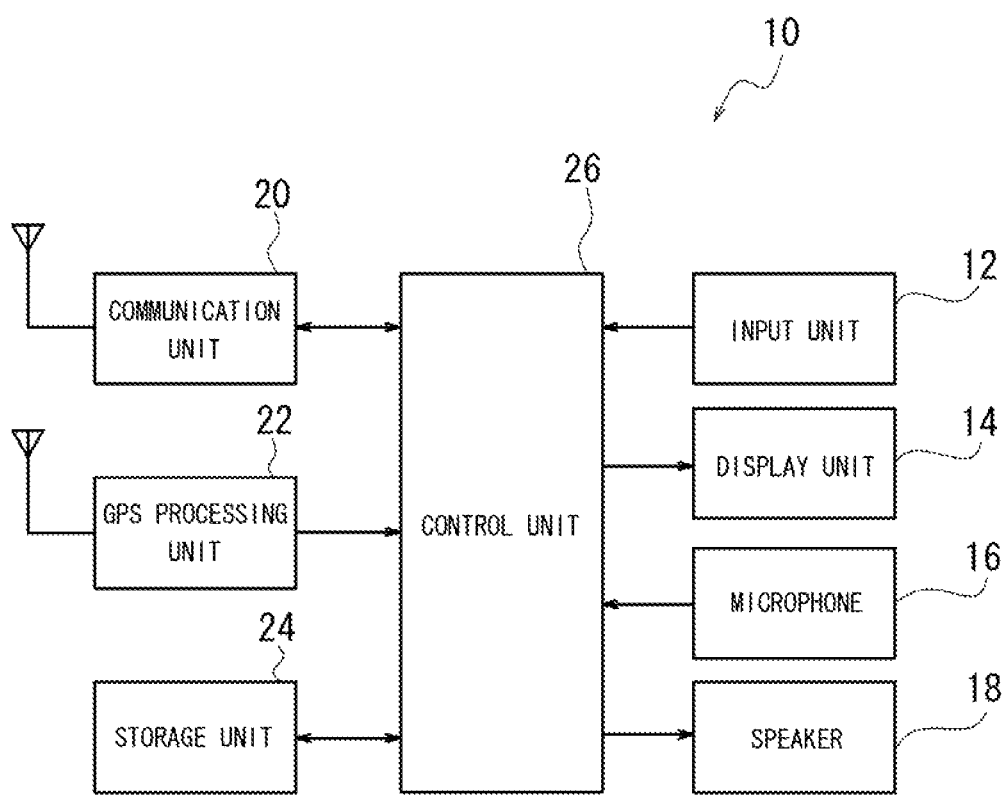
FIG. 1 is a functional block diagram of a cellular phone in accordance with a first embodiment of the present invention.

FIG. 1 is a functional block diagram showing a schematic configuration of a cellular phone 10 in accordance with a first embodiment of the present invention.

As shown in FIG. 1, the cellular phone 10 has an input unit 12 constituted by an operation key group and the like that accepts user input, a display unit 14 constituted by, for example, a liquid crystal display, an organic EL display or the like and for displaying various kinds of information such as input results, a microphone 16 for accepting audio input, a speaker 18 for outputting audio, a communication unit 20 that is a transmission and reception unit for transmitting and receiving information including audio data and e-mail data to and from a base station through an antenna, a GPS processing unit 22 for receiving GPS information (e.g. longitude and latitude data) through a GPS antenna and converting the information into data that can be used by the cellular phone 10, a storage unit 24 for storing various kinds of information such as input information and application and a control unit 26 for controlling the whole cellular phone 10 including these function units.

The input unit 12 may be a key operation unit (not shown) having a plurality of mechanical keys or may be a touch panel (not shown) that is superimposed on the front face of the display unit 14 according to the specification of the cellular phone 10. In addition, for convenience of explanation, the storage unit 24 is explained as a unit not only for storing the information the user has input and various applications and the like, but also for serving as a work memory or a buffer. Further, each function unit of the cellular phone 10 of the present invention can have the same construction as that of the conventional cellular phone that has a general GPS function. Thus the detailed explanations about those function units are omitted.

Figure 2:
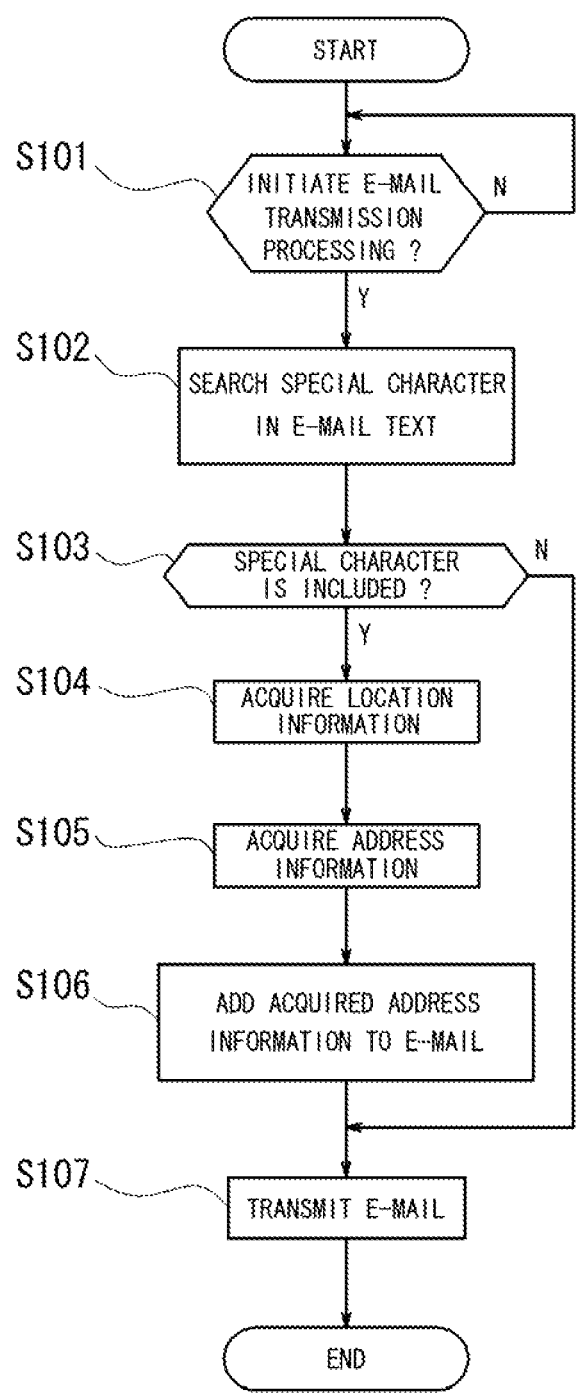
FIG. 2 is a flowchart illustrating operation of a transmission side terminal in accordance with the first embodiment.
Figure 3:
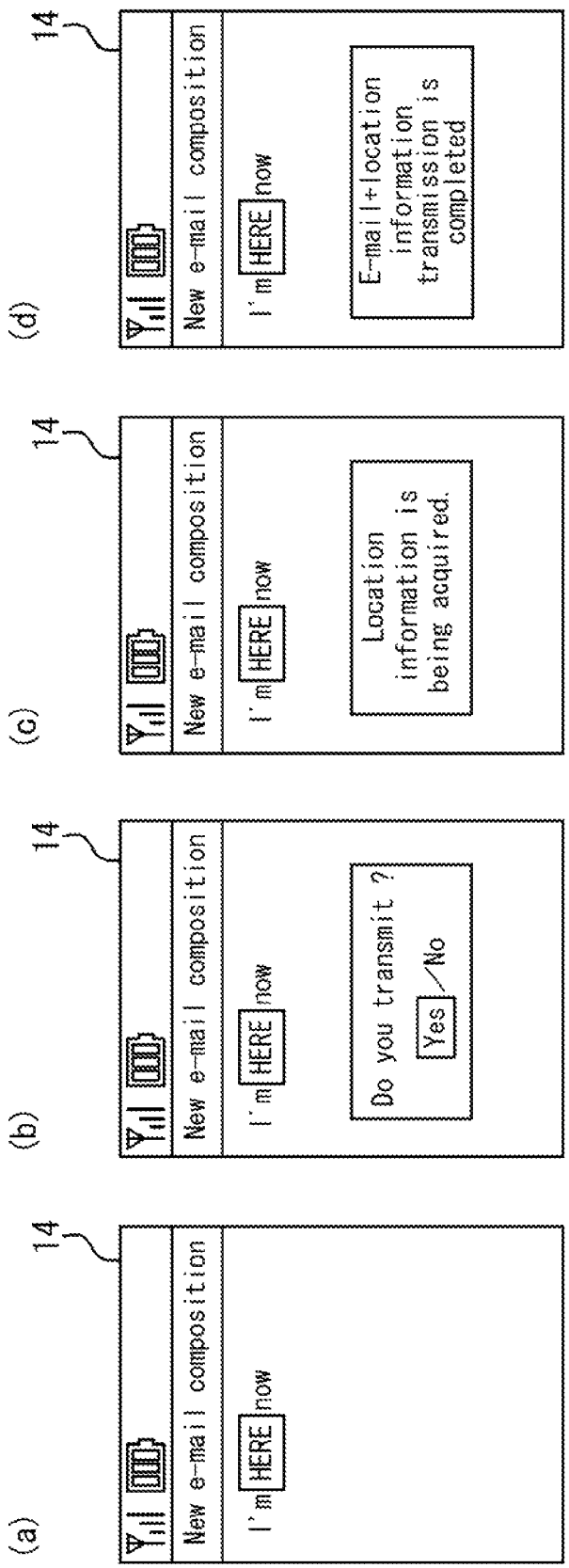
FIG. 3 is a diagram showing examples of display on a screen of a display unit of the transmission side terminal in accordance with the first embodiment.

Operation of the cellular phone 10 in accordance with the present embodiment at transmission of an e-mail is described below with reference to a flowchart in FIG. 2 and examples of a display screen in FIG. 3. In the present embodiment, in order to transmit the location of its own terminal to the corresponding party, the cellular phone 10, the transmission side terminal, acquires, at the time of transmission of an e-mail including a predetermined special character, the address information of its own terminal as the location information and transmits the information with the e-mail.

First, based on the operation by the user to start composing an e-mail, the control unit 26 of the cellular phone 10, which is a transmission side terminal, reads out an e-mail composition application from the storage unit 24 and executes the application to display characters of the e-mail text on the display unit 14 in response to input of characters by the user to the input unit 12. In the present embodiment, when the user wants to transmit his/her present location to the recipient of the e-mail, the user adds a predetermined special character to an e-mail to be transmitted. This predetermined special character may be anything such as a special character, symbol, pictorial symbol, picture, mark, icon, so long as it can be distinguished from the normal characters used for an e-mail. Here, for convenience of explanation, as shown in FIG. 3(a), for example, a pictorial symbol depicting "HERE" is the predetermined special character. The user inputs, in a special character input mode, this special character by selecting it among various kinds of special characters, and inputs letters used for a normal e-mail before and after the special character, thereby composing an e-mail saying 'I am "HERE" now'.

After input of e-mail is performed, the control unit 26 determines whether the user performs an input operation using the input unit 12 to initiate the transmission processing of the completed e-mail (step S101). At this time, the display unit 14 displays a screen as shown in FIG. 3(b), for example. When the input to initiate the e-mail transmission processing is performed, that is, for example, Yes is selected in FIG. 3(b), the control unit 26 encodes the data of this e-mail. In that case, the control unit 26 searches the predetermined special character in the text of the e-mail (step S102) and determines whether or not the predetermined special character is included (step S103).

When it is determined that the predetermined special character is included in the e-mail to be transmitted at step S103, the control unit 26 controls the GPS processing unit 22 to acquire the location information using GPS as the present location of the cellular phone 10 (step S104). At this time, the GPS processing unit 22 calculates, under control of the control unit 26, its location information (e.g. latitude and longitude) by receiving radio waves from the GPS satellite through the GPS antenna. Since the technique to acquire the location information of its own terminal by the positioning system using GPS is known, the detailed explanation thereof is omitted.

Thereafter, the control unit 26 controls so that the location information acquired by the GPS is transmitted from the antenna of the communication unit 20 to the external server (not shown) through the base station (not shown). The external server, when receiving the location information based on the GPS from the cellular phone 10, searches the address information corresponding to the location information and replies to the cellular phone 10 through the base station. Thus the cellular phone 10 acquires the address information of its own terminal (step S105). During the processing at steps S104 and S105, the display unit 14 displays the screen as shown in FIG. 3(c), thereby informing the user that the present location is acquired by using the GPS function, and that the address information based on the present location is now being acquired.

When the address information is acquired as the present location of the cellular phone 10, the control unit 26 associates the acquired address information with the predetermined special character in the e-mail, adds the information to the data of the e-mail (step S106), and then encodes them. Thereafter the control unit 26 controls the communication unit 20 (step S107) to transmit the e-mail to which the address information is added to the reception side terminal through the base station. At this time, for example, the display unit 14 displays a screen as shown in FIG. 3(d), thereby informing the user that the information of the present location of the terminal has been transmitted to the corresponding party with the e-mail text.

When the predetermined special character is not included in the e-mail to be transmitted at step S103, a normal e-mail to which no location information of the terminal is added is transmitted. In this case, as in the case of the known transmission processing of a normal e-mail, the control unit 26 controls so that the e-mail is encoded and transmitted to the reception side terminal from the communication unit 20 (step S107) and finishes the e-mail transmission processing.

In this manner, in the present embodiment, the user who wants to convey his/her present location to the corresponding party can transmit his/her accurate present location based on the GPS information to the corresponding party simply by performing the operation to add a predetermined special character when composing a normal e-mail. Further, since the present location is acquired at the time of e-mail transmission processing, it is possible to transmit the latest information of the present location at the very moment of transmitting the e-mail to the corresponding party. Therefore, the difference between the name of the present location mentioned during composition of the e-mail and the actual present location at the time of transmission of the e-mail, which has occurred in the past due to travel at a high speed, may no longer occur. Therefore, the cellular phone 10, which is a transmission side terminal in accordance with the present embodiment, constitutes a location information acquisition unit by including the communication unit 20, the GPS processing unit 22 and their respective antennas.

Next, operation of the cellular phone 10 in accordance with the present embodiment at the time of reception of an e-mail is described with reference to a flowchart in FIG. 4 and examples of a display screen in FIG. 5. In the present embodiment, the cellular phone 10, the reception side terminal, when receiving an e-mail including a predetermined special character from a transmission side terminal, displays the address of the location of the transmission side terminal in response to the selection of the displayed special character and, displays a map of the location of the transmission side terminal in response to the selection of the special character.

First, the control unit 26 of the cellular phone 10 controls the communication unit 20 to receive an e-mail transmitted by the transmission side terminal from the base station through an antenna (step S201) and stores the received e-mail in a storage unit 24. At this time, when the address information of the transmission side terminal is added to the e-mail by being associated with the predetermined special character, the address information is stored together in the storage unit 24. Here, explanation is given on the assumption that the received e-mail includes the predetermined special character.

When the e-mail is stored, the control unit 26 determines whether the user performs operation to shift to a received e-mail display mode with the input unit 12 so that the user of the reception side terminal can browse the e-mail (step S202). When this operation is performed, the control unit 26 reads out the content of the e-mail from the storage unit 24 and controls the display unit 14 to display the content (step S203). At that time, the display unit 14 displays a screen like FIG. 5(a), for example and, when the special character is included in the displayed e-mail, displays the special character in a manner that makes distinction from the characters used for a normal e-mail.

In FIG. 5(a), the display unit 14 displays a sender in a "From" column, thereby indicating that the sender of the e-mail is registered as the name of Mr. A. In addition, FIG. 5(a) shows a state where the name, Mr. A, of the sender is highlighted or reversed, thereby indicating that the name is selected by a display selection area. The display selection area indicates that some related information that is not displayed in the area has been added, by highlighting, reversing or underlying a part of the information displayed on the display unit 14. In response to the operation to select the area and further to determine it, the process to indicate the related information is started. It is required to associate with initiation of some operations in advance, such as, when input operation is performed with a direction key and the like of the input unit 12, the display selection area is moved to select a predetermined information display part, and the selected part is determined by push of the determination key, an application for displaying the related information is activated.

In FIG. 5(a), the name of a sender is selected by the display selection area. In this state, when the user pushes the determination key of the input unit 12 to determine the selected name, the control unit 26 controls so that the additional information that has been registered with respect to the sender such as an e-mail address of the sender, for example, is displayed on the display unit 14.

After displaying an e-mail text on the display unit 14 at step S203, the control unit 26 determines whether or not the predetermined special character included in the e-mail text is selected by the display selection area based on the user's operation (step S204). FIG. 5(b) shows a state where the display selection area is moved and the predetermined special character indicated by the pictorial symbol, "HERE", in the e-mail text is selected by the user's operation. When the predetermined special character is selected in this manner, the control unit 26 reads out the address information of the transmission side terminal that has been stored by being associated with the special character from the storage unit 24 and pops up the address information near the pictorial symbol, "HERE", which is the predetermined special character, on the display unit 14, as shown in FIG. 5(c) (step S205). For explanation, the states from FIG. 5(b) to FIG. 5(c) show a series of operation in a short period of time in a phased manner. In addition, FIGS. 5(b) and 5(c) show a stage that the predetermined special character (the pictorial symbol of "HERE") has been selected by the display selection area, but has not been determined yet.

Thereafter, at step S206, based on an operation by the user such as to push the determination key of the input unit 12, when an input for determination is further performed in a state where the display selection area selects the special character of "HERE", the control unit 26 activates a map display application that is stored in the storage unit 24 (step S207). Subsequently, the control unit 26 controls so that the address information of the transmission side terminal that has already been received is transmitted from the antenna of the communication unit 20 to the external server (not shown) through the base station (not shown). The external server searches the map information corresponding to the address information and transmits it to the cellular phone 10. When the map information is received by the communication unit 20 through the antenna (step S208), the control unit 26 controls so that the map showing the location of the transmission side terminal is displayed on the display unit 14, as shown in FIG. 5(d), by the map display application (step S209).

In this manner, in the present embodiment, the user who carries a reception side terminal can know, when receiving an e-mail including a predetermined special character that has been transmitted by the e-mail sender, the address of the present location at the moment when the sender has transmitted the e-mail only through a simple operation. Further, the user can also see a map around the location. Thus in the present embodiment, the communication unit 20 serves as a map information acquisition unit.

Figure 4:
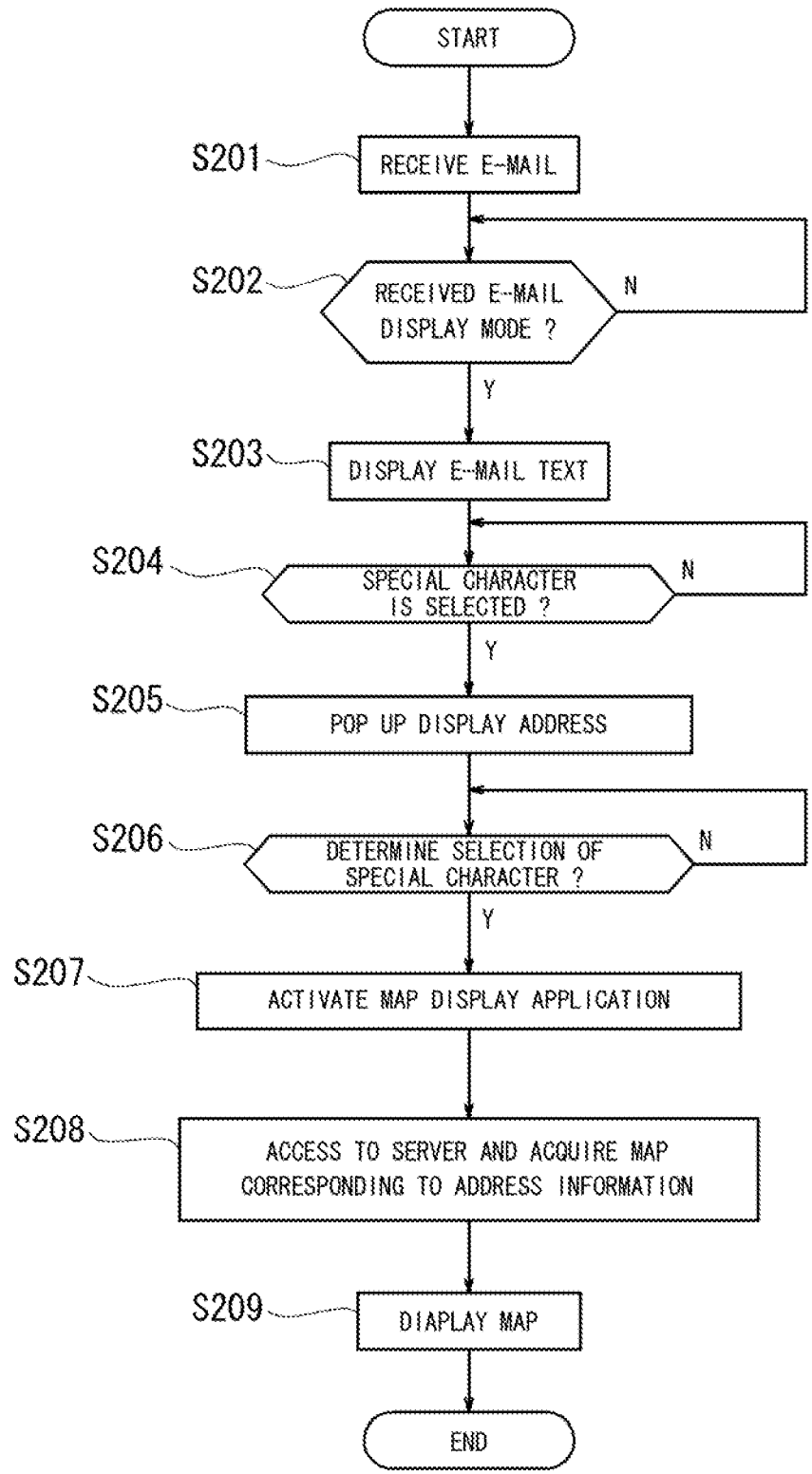
FIG. 4 is a flowchart illustrating operation of a reception side terminal in accordance with the first embodiment.
Figure 5:
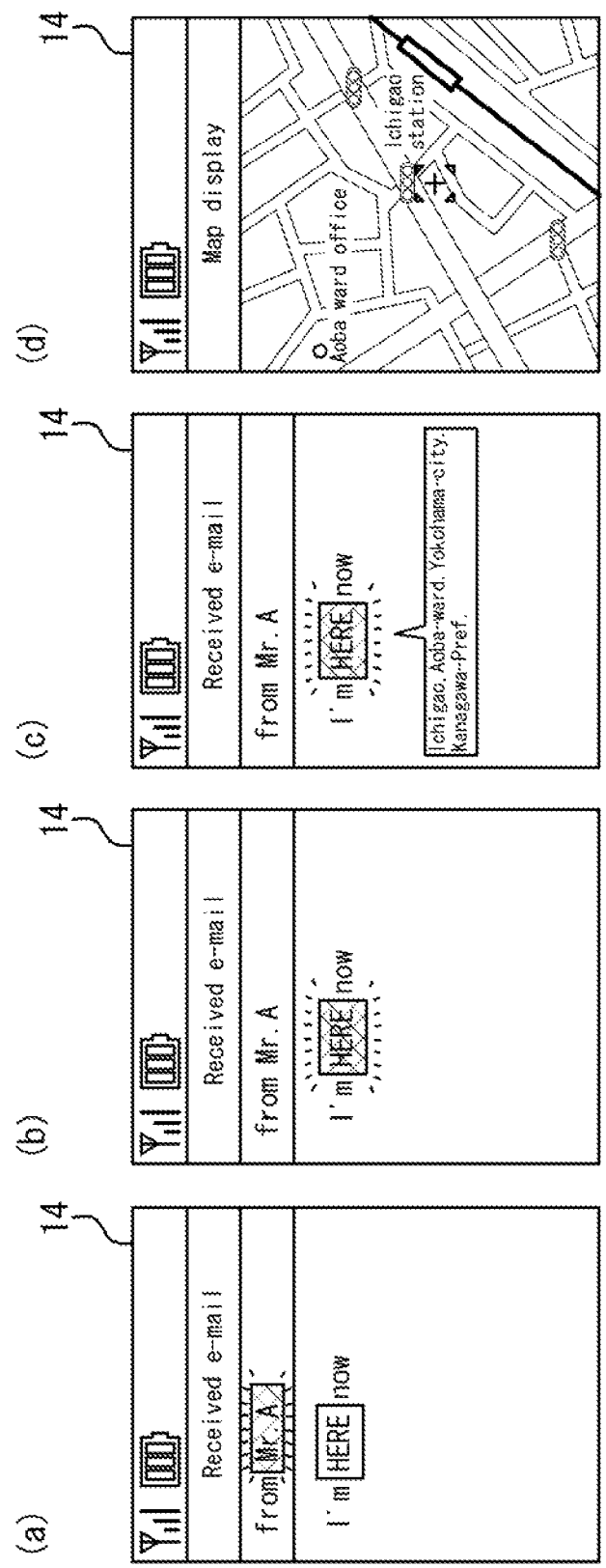
FIG. 5 is a diagram showing examples of display on a screen of a display unit of the reception side terminal in accordance with the first embodiment.

As an alternative of the present embodiment, the user's operation can be further simplified by omitting steps S204 and S205 in FIG. 4, thereby displaying a map immediately. In other words, when an e-mail text is displayed on the display unit 14 at step S203, the e-mail text is displayed in a state where the display selection area has been moved to the location of the special character from the beginning and the special character has already been selected. At that time, the pop-up display of the address is not made and the map is displayed based on the determination of selection of the display selection area by push of the determination key by the user.

In this manner, the cellular phone 10 on the reception side that has received an e-mail, when the user performs operation to display the received e-mail, performs the display as shown in FIG. 5(b), for example, on the display unit 14 from the beginning. In addition, when the selection of the display selection area is determined by the user pushing the determination key, the screen shown in FIG. 5(d), for example, is displayed. In the case where the user on the reception side wants to see a map of the present location of the e-mail sender immediately, it is preferable to perform such setting to the cellular phone 10.

Figure 6:
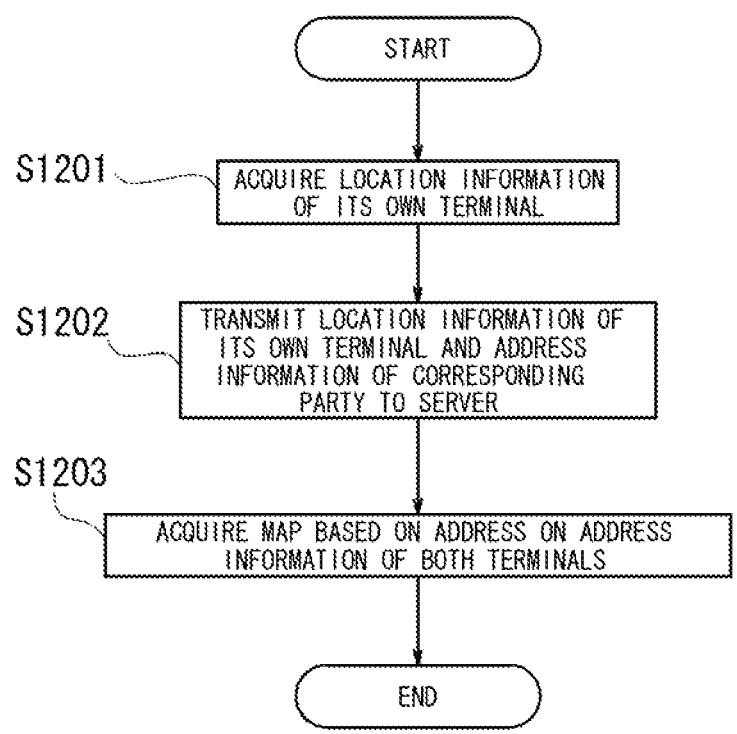
FIG. 6 is a flowchart illustrating an alternative embodiment of the operation of the reception side terminal in accordance with the first embodiment.

Further, when a map is displayed on the display unit 14 at step S208 in FIG. 4, the scale of the map to be displayed can be adjusted depending on the location relationship between the transmission side terminal and the reception side terminal. For example, a manner in which step S208 in FIG. 4 is replaced with the process shown by the flowchart in FIG. 6 may be applied. Specifically, when the reception side terminal is connected to the external server to acquire data for displaying a map (the map information), the GPS processing unit 22 of the cellular phone 10, which is the reception side terminal, acquires the location information of its own terminal (step S1201). Next, this acquired location information of its own terminal and the address information of the transmission side terminal that has already been acquired are transmitted together to the external server by the communication unit 20 (step S1202). The external server selects an appropriate map based on the location relationship between them and transmits the map information. Then the cellular phone 10 receives the map information by the communication unit 20 (step S1203).

Figure 7:
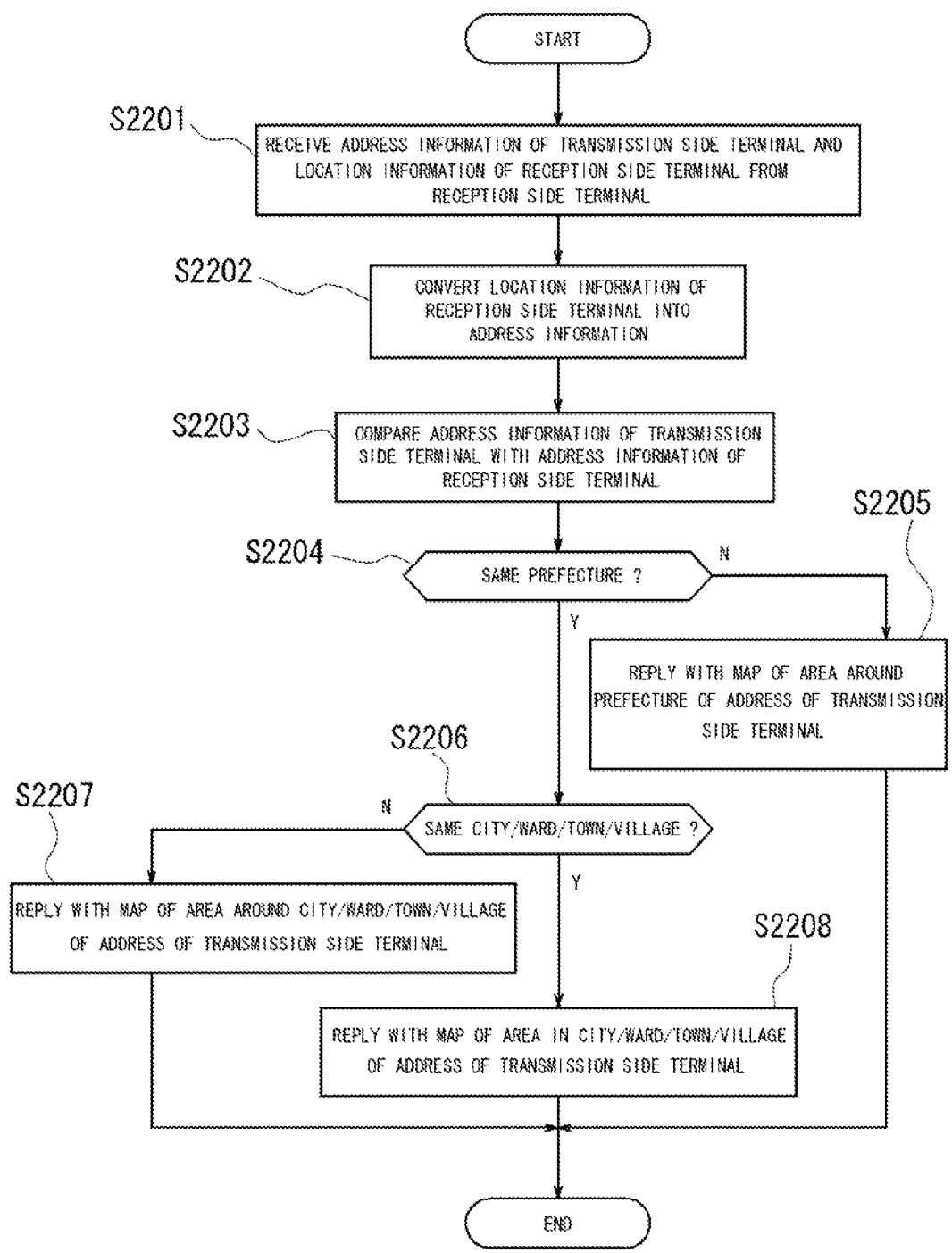
FIG. 7 is a flowchart illustrating an example of processing by a server that communicates with the reception side terminal in accordance with the alternative of the first embodiment.

An example of the process performed by the external server at this time is shown by the flowchart in FIG. 7. First, when the external server receives the address information of the transmission side terminal and the location information of the reception terminal transmitted by the reception side terminal (step S2201), the external server converts the location information of the reception side terminal into the corresponding address information (step S2202) and compares these pieces of address information (step S2203). When the addresses of both terminals are not in the same prefecture (No at step S2204), the information of a map around the prefecture of the address of the transmission side terminal is transmitted (step S2205). When the addresses of both terminals are in the same prefecture (Yes at step S2204) and not the same city/ward/town/village (No at step S2206), the information of a map around the city/ward/town/village of the address of the transmission side terminal is transmitted (step S2207). When the addresses of both terminals are in the same prefecture (Yes at step S2204) and further in the same city/ward/town/village (Yes at step S2206), a map in the city/ward/town/village of the address of the transmission side terminal is transmitted (step S2208).

Figure 8:
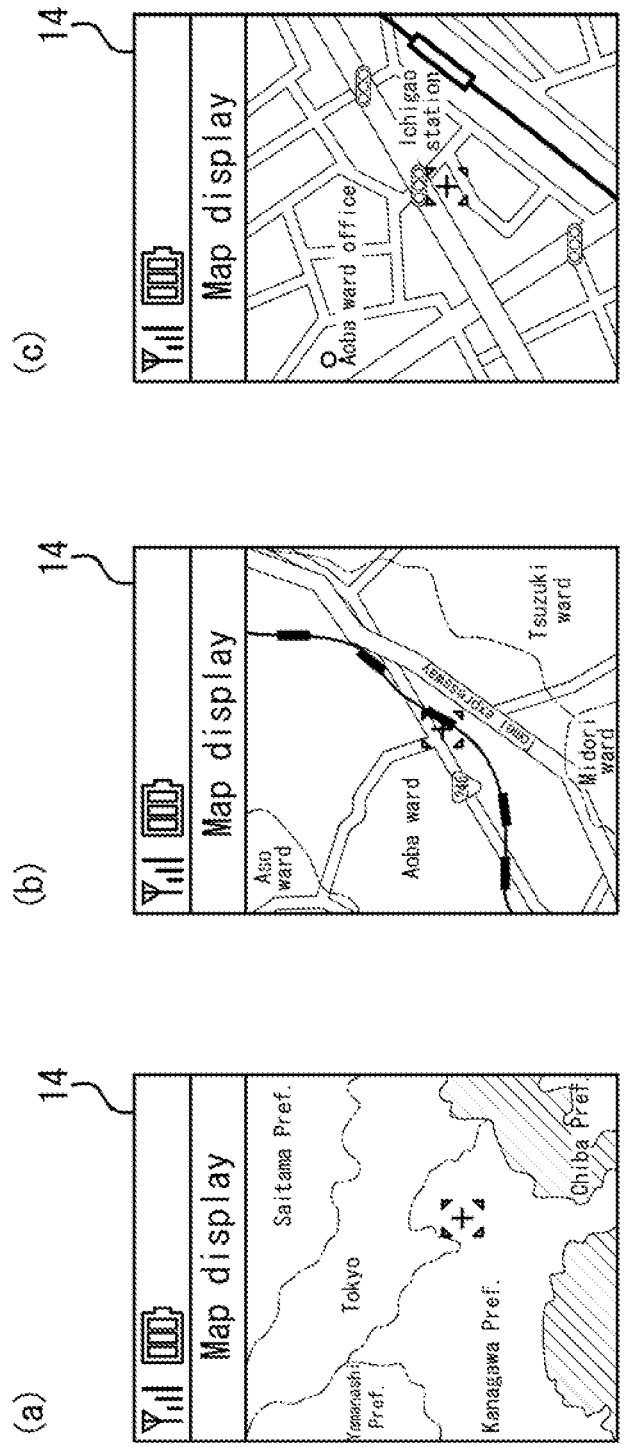
FIG. 8 is a diagram showing examples of display on a screen of the display unit of the reception side terminal in accordance with the alternative of the first embodiment.

An appropriate map can be displayed on the display unit 14 of the reception side terminal through such process depending on the distance from the corresponding party. In other words, when the transmission side terminal of the corresponding party is not in the same prefecture as that of the reception side terminal, the location of the corresponding party is displayed by a map having a scale that allows display extending some prefectures (e.g. 1:1 000 000) as shown in FIG. 8(a). When the transmission side terminal of the corresponding party is in the same prefecture as that of the reception side terminal, the location of the corresponding party is displayed by a map having a scale that allows display extending some cities (e.g. 1:100 000) as shown in FIG. 8(b). When the transmission side terminal of the corresponding party is in the same city/ward/town/village as that in the reception side terminal, the location of the corresponding party is displayed by a map having a scale that allows showing the details of the city/ward/town/village as shown in FIG. 8(c).

Moreover, as another example of the process performed by the external server, instead of the process shown by the flowchart in FIG. 7, it is possible that the server selects a map having a scale or a range that allows locations of both terminals to be shown in one map based on the received address information of the transmission side terminal and address information of the reception side terminal and replies with the map information to the reception side terminal. In this manner, a map that enables a user to recognize easily the relative location relation between the transmission side terminal and the reception side terminal can be displayed.

(Second Embodiment)

Next, the cellular phone 10 in accordance with a second embodiment of the present invention is described.

In the present embodiment, as in the case of the first embodiment described above, the cellular phone 10, the transmission side terminal acquires, at the time of transmission of an e-mail including a predetermined special character, the address information of its own terminal as the location information and transmits the information with the e-mail. On the other hand, unlike the first embodiment, on receiving an e-mail including a predetermined special character from the transmission side terminal, the cellular phone 10, the reception side terminal, displays the special character by converting it into a part of the address when displaying an e-mail text, and displays a map of the location of the transmission side terminal if the selection of the display is determined.

In the present embodiment, the terminals on both transmission and reception sides can be configured in the same manner as the cellular phone 10 described above. Therefore the same descriptions as those for the first embodiment are omitted. Moreover, since the cellular phone 10, the transmission side terminal, operates in the same manner as that of the first embodiment, the explanation thereof is omitted.

Operation of the cellular phone 10, a reception side terminal, in accordance with the present embodiment, at the time of reception of an e-mail is described below with reference to a flowchart in FIG. 9 and examples of a display screen in FIG. 10.

First, on receiving an e-mail transmitted from the transmission side terminal (step S301), the cellular phone 10 stores the received e-mail in a storage unit 24. At this time, when the address information of the transmission side terminal is added to the e-mail by being associated with a predetermined special character, the address information is also stored in the storage unit 24. Here, explanation is given on the assumption that a received e-mail includes a predetermined special character.

After storing the e-mail, the control unit 26 determines whether the user performs operation to shift to a received e-mail display mode using the input unit 12 so that the user of the reception side terminal can browse the e-mail (step S302). When this operation is performed, the control unit 26 reads out the content of the e-mail from the storage unit 24 and controls the display unit 14 to display the content (step S303). At that time, the control unit 26 reads out address information being associated with the predetermined special character from the storage unit 24 and selects at least a part of the address information (e.g. in the case of Japan, the name of the address that comes between the name of the city or ward and the block number), and controls the display unit 14 to display it as a special character. When such a part of the address is displayed, the control unit 26 controls so that the part of the address is displayed in a state of being selected by the display selection area.

By the process as above, when the transmission side terminal transmits an e-mail simply by adding a special character, "HERE", as shown in FIG. 3(a), the e-mail is received and displayed on the display unit by the reception side terminal, and at that time, the special character is converted into a part of the address that indicates the location roughly, and the part of the address is displayed in a state of being selected by the display selection area from the beginning as shown in FIG. 10(a).

After the e-mail text is displayed on the display unit 14 at step S303, when a determination input is performed while holding the state where the display selection area selects the display of the part of the address based on the operation by the user to push the determination key of the input unit 12 at step S304, the control unit 26 activates the map display application stored in the storage unit 24 (step S305).

Thereafter, in the same manner as the operation of the map display of the reception side terminal in accordance with the first embodiment, the address information of the transmission side terminal stored in the storage unit 24 is transmitted from the communication unit 20 to the external server (not shown) through the base station (not shown). The external server selects the map information corresponding to the address information and replies with the map information to the cellular phone 10. The control unit 26 controls the communication unit 20 to acquire the map information (step S306) and, as shown in FIG. 10(b), for example, displays a map showing the location of the transmission side terminal on the display unit 14 using the map display application (step S307). In this case, in the same manner as described in the first embodiment, the scale and the range of the map to be displayed may be adjusted depending on the location relationship between the transmission side terminal and the reception side terminal.

In this manner, in the present embodiment, the user of the transmission side terminal can transmit his/her present location at the time of transmission processing of an e-mail to the corresponding party simply by adding one predetermined special character when composing a normal e-mail. In addition, the user of the reception side terminal can know roughly the address of the present location of the corresponding party at a moment when the received e-mail is displayed, and can see a map around the location corresponding to the address through a simple operation.

Figure 9:
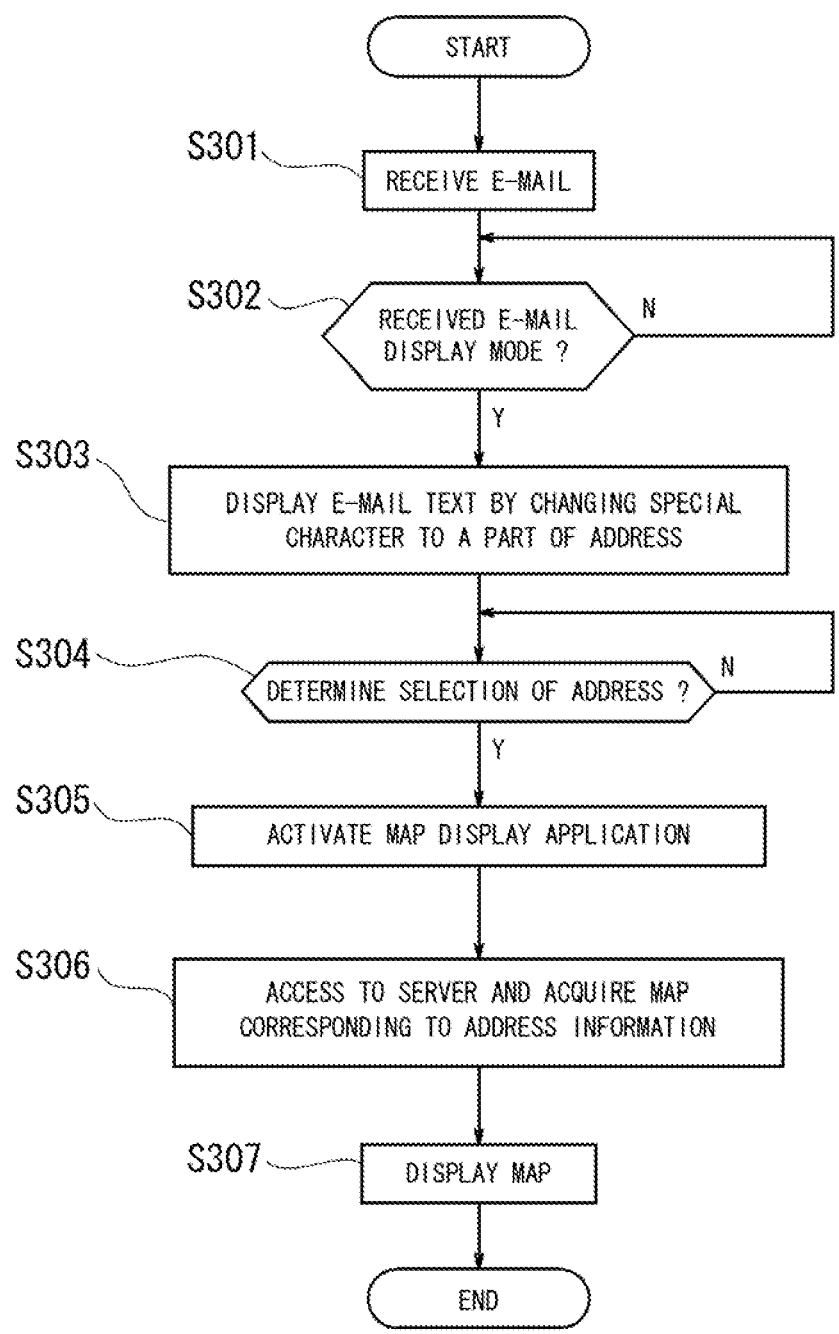
FIG. 9 is a flowchart illustrating operation of a reception side terminal in accordance with a second embodiment.
Figure 11:
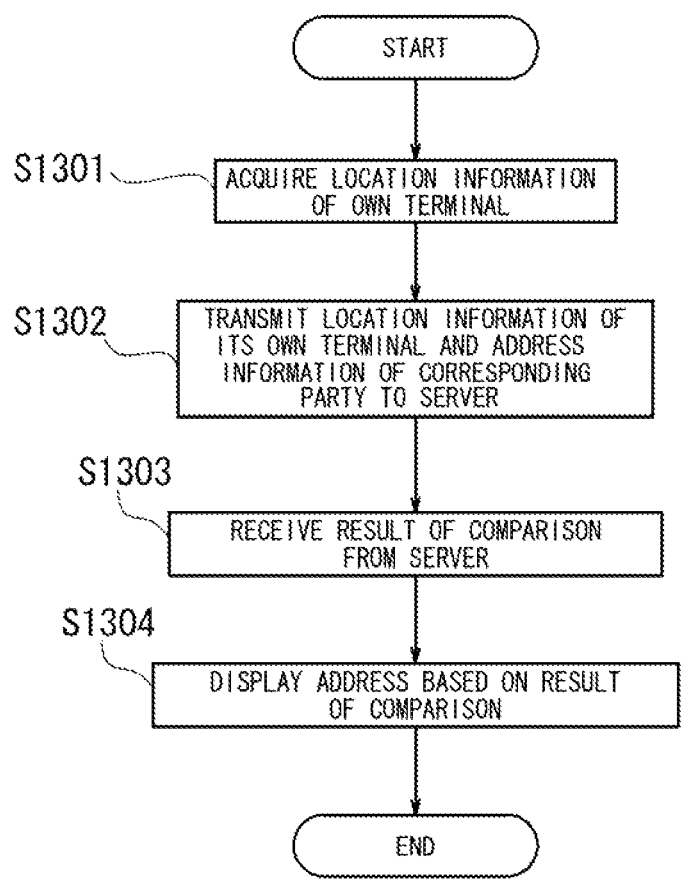
FIG. 11 is a flowchart illustrating an alternative embodiment of the operation of the reception side terminal in accordance with the second embodiment.

In addition, when a part of the address is displayed on the display unit 14 at step S303 in FIG. 9, a part of the address to be displayed may be selected depending on the location relationship between the transmission side terminal and the reception side terminal. For example, a manner in which step S303 in FIG. 9 is replaced with the process shown in the flowchart in FIG. 11 may be considered. In other words, when displaying an e-mail including a special character on the display unit 14, the cellular phone 10 acquires the location information of its own terminal using the GPS processing unit 22 of the cellular phone 10, which is the reception side terminal (step S1301). Next, the acquired location information of its own terminal and the address information of the transmission side terminal that has already been acquired are transmitted together to the external server by the communication unit 20 (step S1302). The external server compares the locations of them received from the cellular phone 10, selects an appropriate part of the address and replies with the information of the selected part of the address. When receiving the address information from the external server (step S1303), the cellular phone 10 displays the e-mail text with indicating the information of the part of the address as a special character (step S1304).

Figure 12:
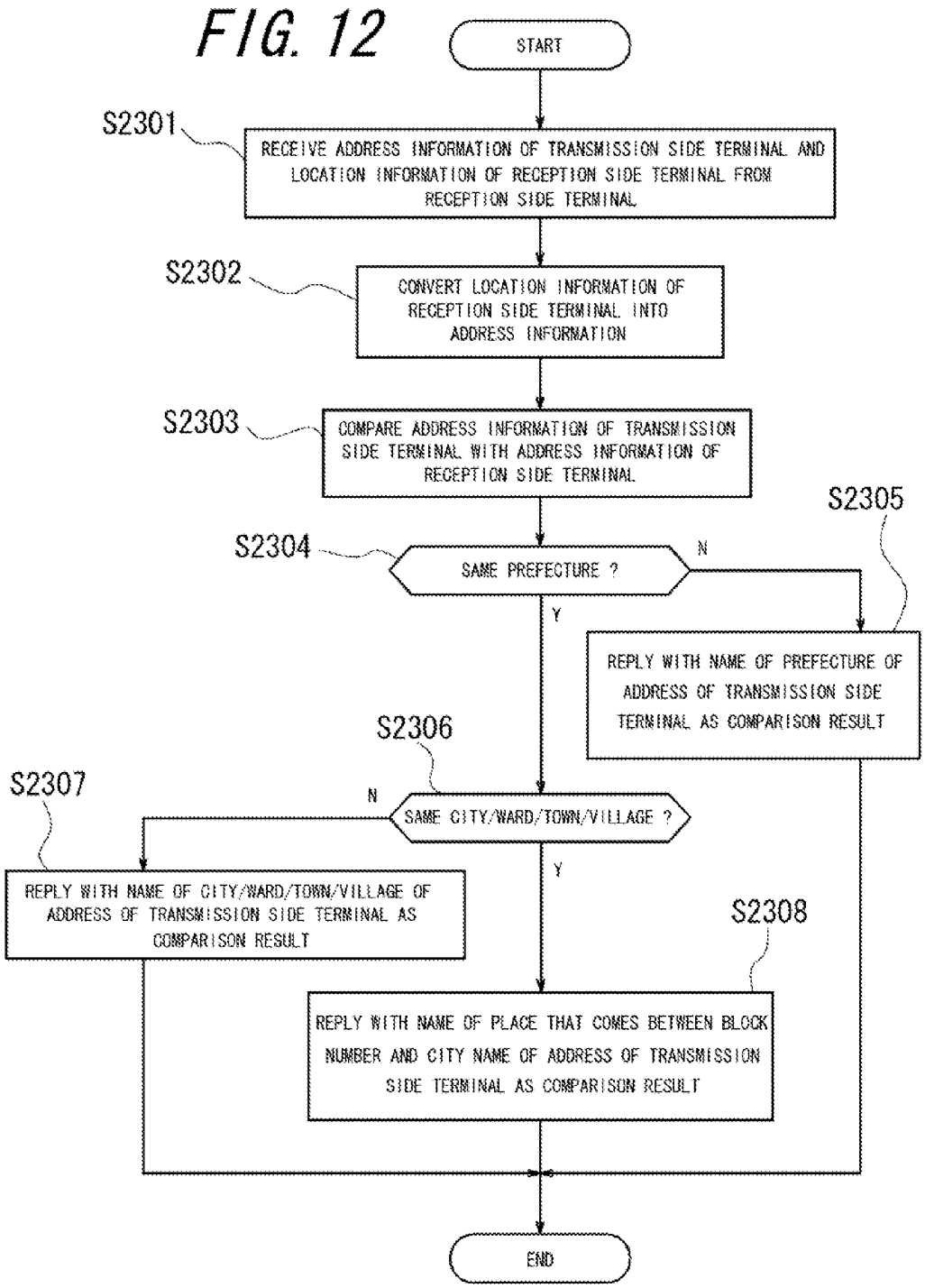
FIG. 12 is a flowchart illustrating an example of processing by a server that communicates with the reception side terminal in accordance with the alternative of the second embodiment.

An example of the process performed by the external server in this case is shown in a flowchart in FIG. 12. First, when receiving the address information of the transmission side terminal and the location information of the reception side terminal transmitted from the reception side terminal (step S2301), the external server converts the location information of the reception side terminal into the corresponding address information (S2302) and compares both of these pieces of address information (step S2303). When the addresses of both terminals are not in the same prefecture (No at step S2304), the name of the prefecture of the address of the transmission side terminal is transmitted as a result of the comparison (step S2305). When the addresses of both terminals are in the same prefecture (Yes at step S2304) and not in the same city/ward/town/village (No at step S2306), the name of the city/ward/town/village of the address of the transmission side terminal is transmitted as a result of the comparison (step S2307). When the addresses of both terminals are in the same prefecture (Yes at step S2304) and in the same city/ward/town/village (Yes at step S2306), the name that comes between the name of the city/ward/town/village and the block number of the address of the transmission side terminal is transmitted as a result of the comparison (step S2308).

By performing the above process, an appropriate part of the address can be displayed on the display unit 14 of the reception side terminal depending on the distance from the corresponding party. In other words, when the transmission side terminal of the corresponding party is not in the same prefecture as that of the reception side terminal, the location of the corresponding party is displayed as the name of the prefecture as shown in FIG. 13(*a*). When the transmission side terminal of the corresponding party is in the same prefecture as that of the reception side terminal as shown in FIG. 13(*b*), the location of the corresponding party is displayed as the name of the city/ward/town/village. When the transmission side terminal of the corresponding party is in the same city/ward/town/village as that of the reception side terminal, as shown in FIG. 13(*c*), the location of the corresponding party is displayed as more detailed name of the place.

(Third Embodiment)

Next, the cellular phone 10 in accordance with a third embodiment of the present invention is described. In the present embodiment, when the user wants to convey his/her present location to the corresponding party, the user can transmit the information of a building and the like that exists near him/her and that can be a landmark (hereinafter referred to as a landmark) to the corresponding party by adding a predetermined special character to an e-mail. In the present embodiment, the terminals on both transmission and reception sides can have the same configuration as that of the cellular phone 10 described above. Therefore the same descriptions as those of the above embodiments are omitted. In addition, since operations and processes by the terminals on transmission and reception sides are almost the same as those of the above embodiments, only the different points are mainly described and the same descriptions as those described above are appropriately omitted.

Figure 14:
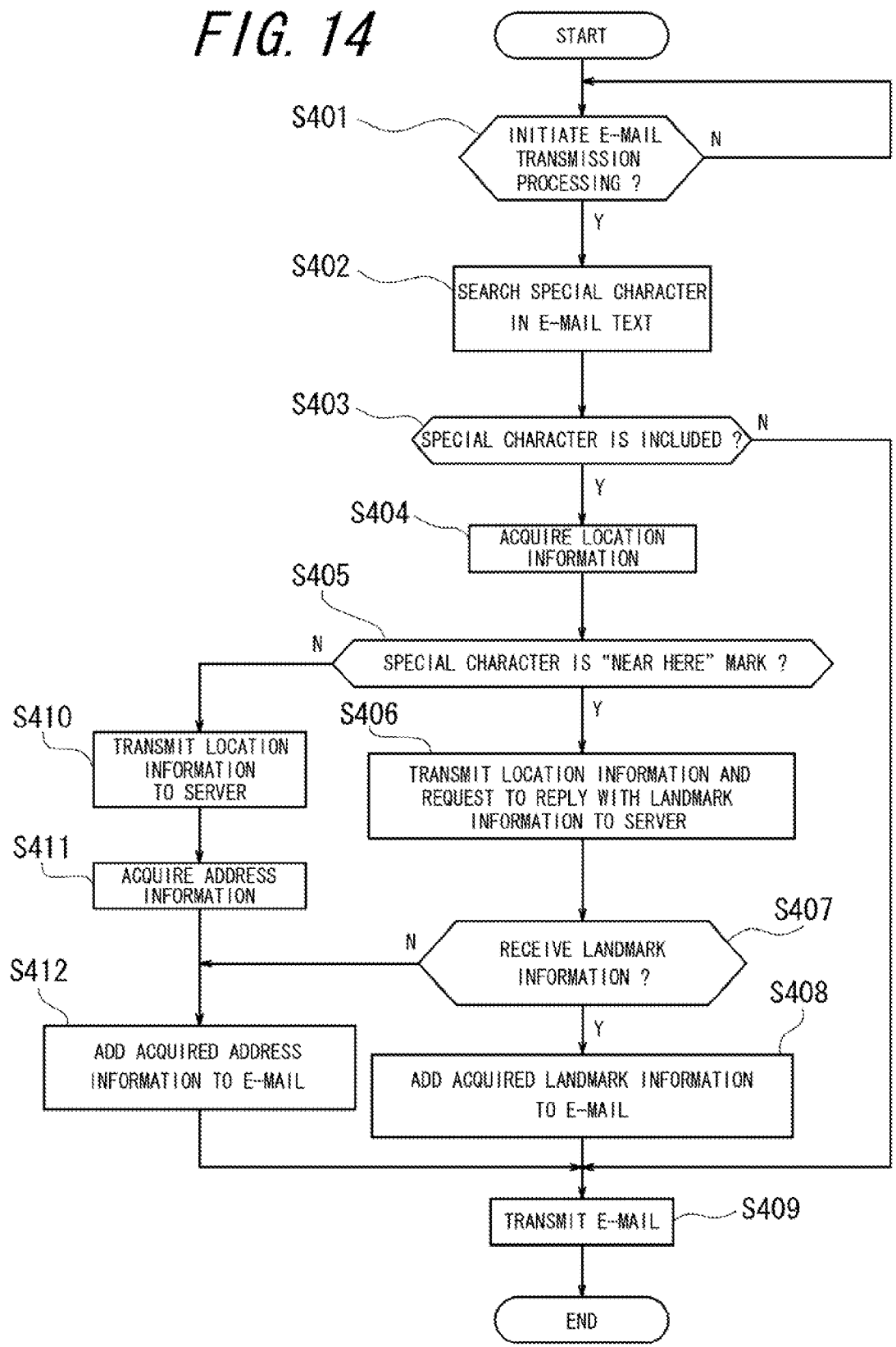
FIG. 14 is a flowchart illustrating operation of a transmission side terminal in accordance with a third embodiment.

Operation of the cellular phone 10 in accordance with the present embodiment at the time of transmission of an e-mail is described below with reference to a flowchart in FIG. 14. The cellular phone 10 of the transmission side terminal in accordance with the present embodiment, when transmitting an e-mail including a predetermined special character, acquires information on a neighboring landmark as the location information of its own terminal and transmits the information with the e-mail.

Also in the present embodiment, when the user wants to convey his/her present location to the recipient of the e-mail, the user adds a predetermined special character to the e-mail to transmit. In this case, for convenience of explanation, for example, a pictorial symbol depicting "NEAR HERE" is the predetermined special character. The user inputs the special character by selecting among various special characters or the like in the special character input mode and inputs letters that are used for a normal e-mail before and after the predetermined special character, thereby composing an e-mail saying 'I'm "NEAR HERE" now'.

After the e-mail is input, the control unit 26 determines whether or not the user performs an input operation to initiate the transmission processing of the completed e-mail using the input unit 12 (step S401). When the input operation to initiate the e-mail transmission processing is performed, the control unit 26 encodes the data of the e-mail. In that case, the control unit 26 searches a predetermined special character in the text of the e-mail (step S402) and determines whether or not the predetermined special character is included (step S403).

If it is determined that the e-mail to be transmitted includes the predetermined special character at step S403, the GPS processing unit 22 acquires, as the present location of the cellular phone 10, the location information by the GPS (step S404). In this case, the GPS processing unit 22 acquires the location information by the GPS not only when the detected predetermined special character is the special character of aforementioned "NEAR HERE", but also when the special character of "HERE", for example, is detected as described in the first and second embodiments.

Next, it is determined whether or not the predetermined special character detected at step S403 is the special character of the "NEAR HERE" (step S405). In the case where the detected special character is "NEAR HERE", the transmission unit 20 transmits a request for replying with the landmark information to the external server with the location information acquired by the GPS (step S406).

The external server searches the information on the landmark around the location from the location information based on the GPS that has been transmitted, and when the landmark exists, for example, within a radius of 500 m from the spot indicated by the location information, replies with the landmark information including the name of the nearest landmark and the address information thereof to the cellular phone 10. When there is no landmark around the location, the external server replies with the address information corresponding to the location information of the transmission side terminal. The external server defines, based on the environmental setting of the terminal by the user of the transmission side terminal, for example, what kind of building and the like to be selected as a landmark and searches a landmark based on the definition.

When the communication unit 20 of the cellular phone 10, which is a transmission side terminal, can receive the landmark information at step S407, the control unit 26 adds the acquired landmark information to data of the e-mail to be associated with the predetermined special character ("NEAR HERE") in the e-mail (step S408) and encodes them. Thereafter the control unit 26 controls the communication unit 20 to transmit the e-mail to which the landmark information is added (step S409).

On the other hand, when the special character of "NEAR HERE" is not detected in the special characters in the e-mail at step S405, the control unit 26 transmits the location information to the external server (step S410), as in the case of the first and second embodiments. Thus the control unit 26 acquires the address information of its own terminal (step S411), adds the address information to the e-mail to be associated with the special character (step S412) and transmits the e-mail (step S409).

When the address information of the transmission side terminal is transmitted from the external server at step S407 for the reason that no landmark exists around the transmission side terminal and the like, for example, the control unit 26 adds the address information to the e-mail to be associated with the special character (step S412), and then transmits the e-mail (step S409). In this case, it is preferable that the special character to be transmitted is changed from "NEAR HERE" to "HERE" at step S412.

On the other hand, when no special character is included in the e-mail to be transmitted at step S403, a normal e-mail to which no location information of its own terminal is added is transmitted.

In this manner, in the present embodiment, the user who wants to convey his/her present location to the corresponding party can transmit the information of a building and the like that exists around his/her present location and that can be a landmark based on the accurate present location of the user based on the GPS information only by performing operation to add a predetermined special character when composing a normal e-mail.

Next, operation of the cellular phone 10 in accordance with the present embodiment at the time of reception of an e-mail is described with reference to a flowchart in FIG. 15 and examples of a display screen in FIG. 16. In the present embodiment, when receiving an e-mail including a predetermined special character ("NEAR HERE") from the transmission side terminal, the cellular phone 10 of the reception side terminal displays the name of the landmark which locates near the location of the transmission side terminal in response to selection of the special character displayed. Moreover, the cellular phone 10 displays a map indicating the location of the landmark in response to determination of the selection of the special character.

Since the operation of the cellular phone 10, which is a reception side terminal, in accordance with the present embodiment is almost the same as that in accordance with the first embodiment, overlapped descriptions are appropriately omitted.

The cellular phone 10 receives an e-mail transmitted from the transmission side terminal and stores the e-mail in the storage unit 24 at step S501, when being shifted to a received e-mail display mode at step S502, reads out the content of the e-mail from the storage unit 24 and displays it on the display unit 14 at step S503 in the same manners as those of the first embodiment. Here, explanation is given on the assumption that the received e-mail includes a predetermined special character.

After displaying the e-mail text at step S503, it is determined whether or not the predetermined special character included in the e-mail text is selected by the display selection area based on the user's operation (step S504). FIGS. 16(a) and 16(b) sequentially show a state where the display selection area is moved by the user's operation, for example, from the display part of the sender (From column) to the special character of "NEAR HERE" in the e-mail text. In this manner, when the predetermined special character is selected, the landmark information of the transmission side terminal is read out from the storage unit 24 and, among the landmark information, the name of the landmark, for example, is popped up near the pictorial symbol of "NEAR HERE", which is the predetermined special character, on the display unit 14 (step S505) as shown in FIG. 16(c), for example. For explanation, FIG. 16(b) to FIG. 16(c) show a series of operation in a short period of time in a phased manner. In addition, FIGS. 16(b) and 16(c) show a stage that the predetermined special character (the pictorial symbol of "NEAR HERE") has been selected by the display selection area, but has not been determined yet.

Thereafter, at step S506, based on the operation by the user such as to push the determination key of the input unit 12, when a determination input is further performed in a state where the display selection area selects the special character of "NEAR HERE", the control unit 26 activates a map display application (step S507). Then, the communication unit 20 transmits the address information of the landmark among the landmark information described above from the antenna to the external server (not shown) through the base station (not shown). The external server selects the map information corresponding to the address information of the landmark and replies with the map information to the cellular phone 10. The map information from the external server is received by the communication unit 20 through the antenna (step S208), and as shown in FIG. 16(d), for example, a map indicating the location of the landmark around the transmission side terminal is displayed on the display unit 14 by the map display application (step S509). In the same manner as described in the first embodiment, the scale and the range of the map to be displayed may be adjusted depending on the location relationship between the transmission side terminal and the reception side terminal.

In this manner, in the present embodiment, the user who carries a reception side terminal can know, when receiving an e-mail including a predetermined special character that has been transmitted by an e-mail sender, the landmark around the present location at the moment when the sender has transmitted the e-mail through a simple operation. Further, the user can also see the neighboring map of the location.

Figure 15:
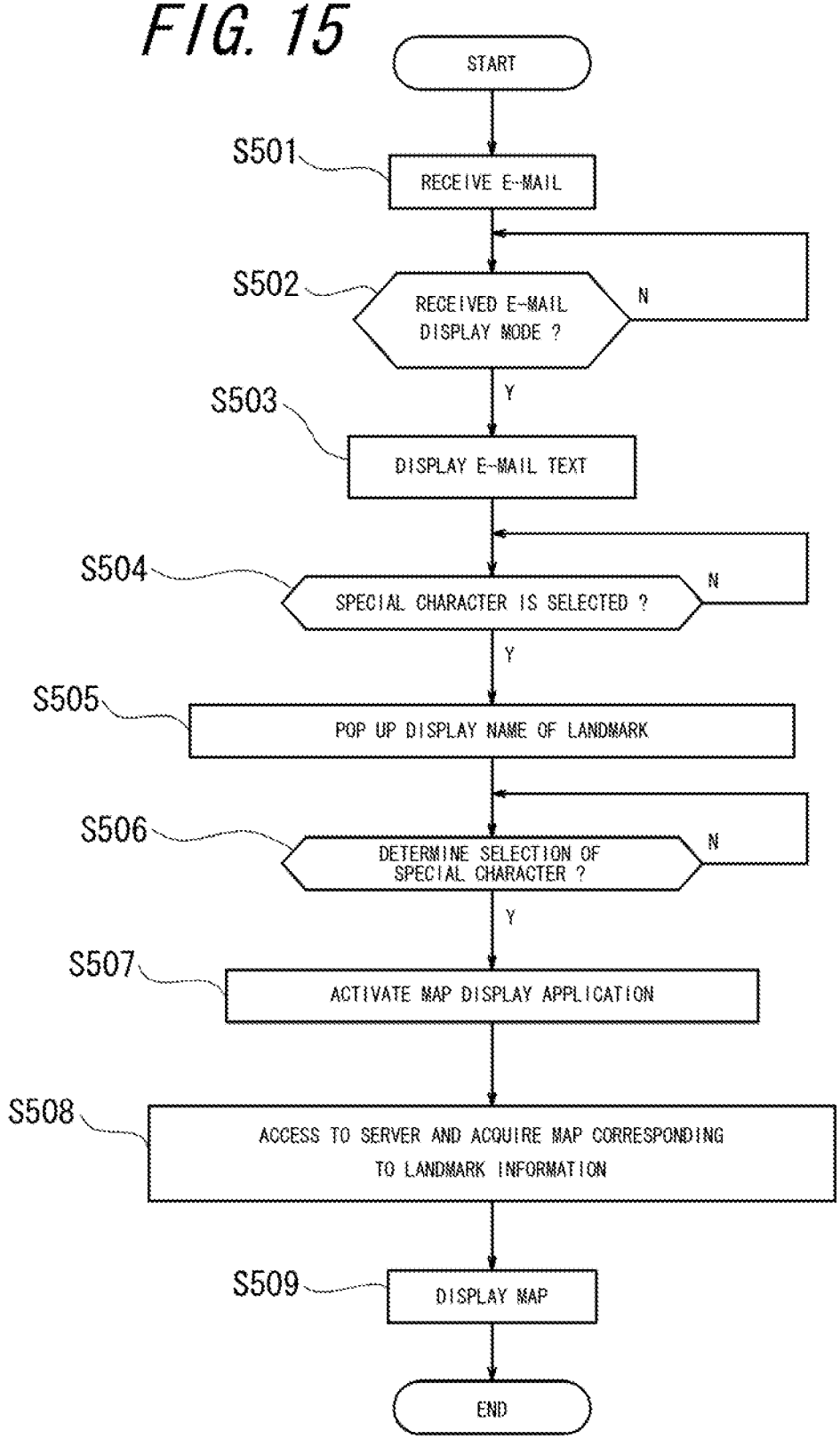
FIG. 15 is a flowchart illustrating operation of a reception side terminal in accordance with the third embodiment.
Figure 16:
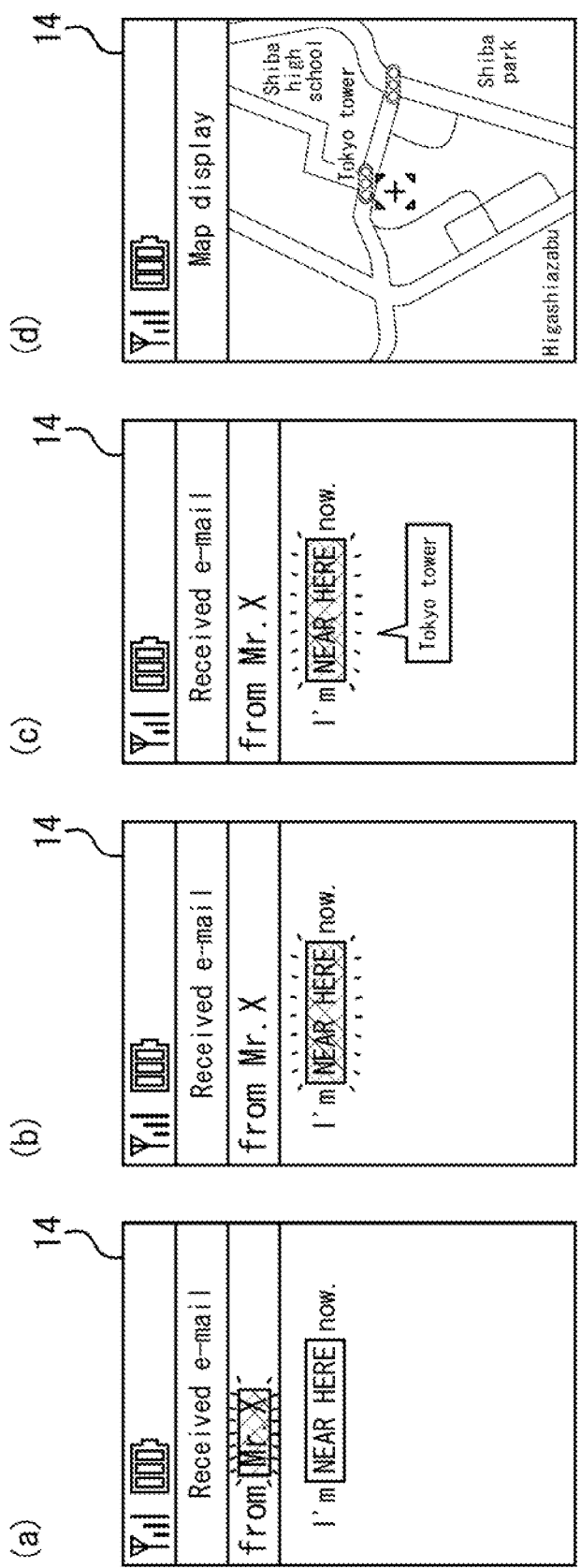
FIG. 16 is a diagram showing examples of display on a screen of a display unit of the reception side terminal in accordance with the third embodiment.

In the present embodiment, as in the case of the alternative described in the first embodiment, steps S504 and S505 of FIG. 15 may be omitted, thereby further facilitating the user's operation and displaying a map immediately. In this case, the cellular phone 10 on the reception side that has received an e-mail displays, when the user performs operation to display the received e-mail, a screen as shown in FIG. 16(b), for example, on the display unit 14 from the beginning. Further, when the user pushes the determination key to determine selection of the display selection area, the display shown in FIG. 16(d) is made.

In addition, when no landmark exists around when the transmission side terminal transmits the e-mail (No at step S407 of FIG. 14), the landmark information is not transmitted by the transmission side terminal and the address information of the transmission side terminal is transmitted. In that case, the same process as that of the first embodiment is performed thereafter and the address of the present location of the transmission side terminal is displayed, and a map around the address is displayed.

(Fourth Embodiment)

Next, explanation of the cellular phone 10 in accordance with a fourth embodiment of the present invention is given. In the present embodiment, the cellular phone 10 of the transmission side terminal operates in the same manner as that of the third embodiment. On the other hand, the cellular phone 10 of the reception side terminal operates in the same manner as that of the second embodiment. However, the information to be processed is not the address information of the present location of the sender, but the information of the landmark around the present location of the sender.

Specifically, the cellular phone 10 of the transmission side terminal acquires the landmark information based on the location information of its own terminal at the time of transmission of an e-mail including a predetermined special character and transmits the landmark information with the e-mail. On the other hand, when receiving the e-mail including the predetermined special character from the transmission side terminal, the cellular phone 10 of the reception side terminal displays the special character by changing it to the name of the landmark when displaying the e-mail text. Further, when the selection of the display is determined, the cellular phone 10 displays a map of the location of the landmark. Since the operation of the cellular phone 10, which is the transmission side terminal, is the same as that of the third embodiment, explanation thereof is omitted.

Figure 17:
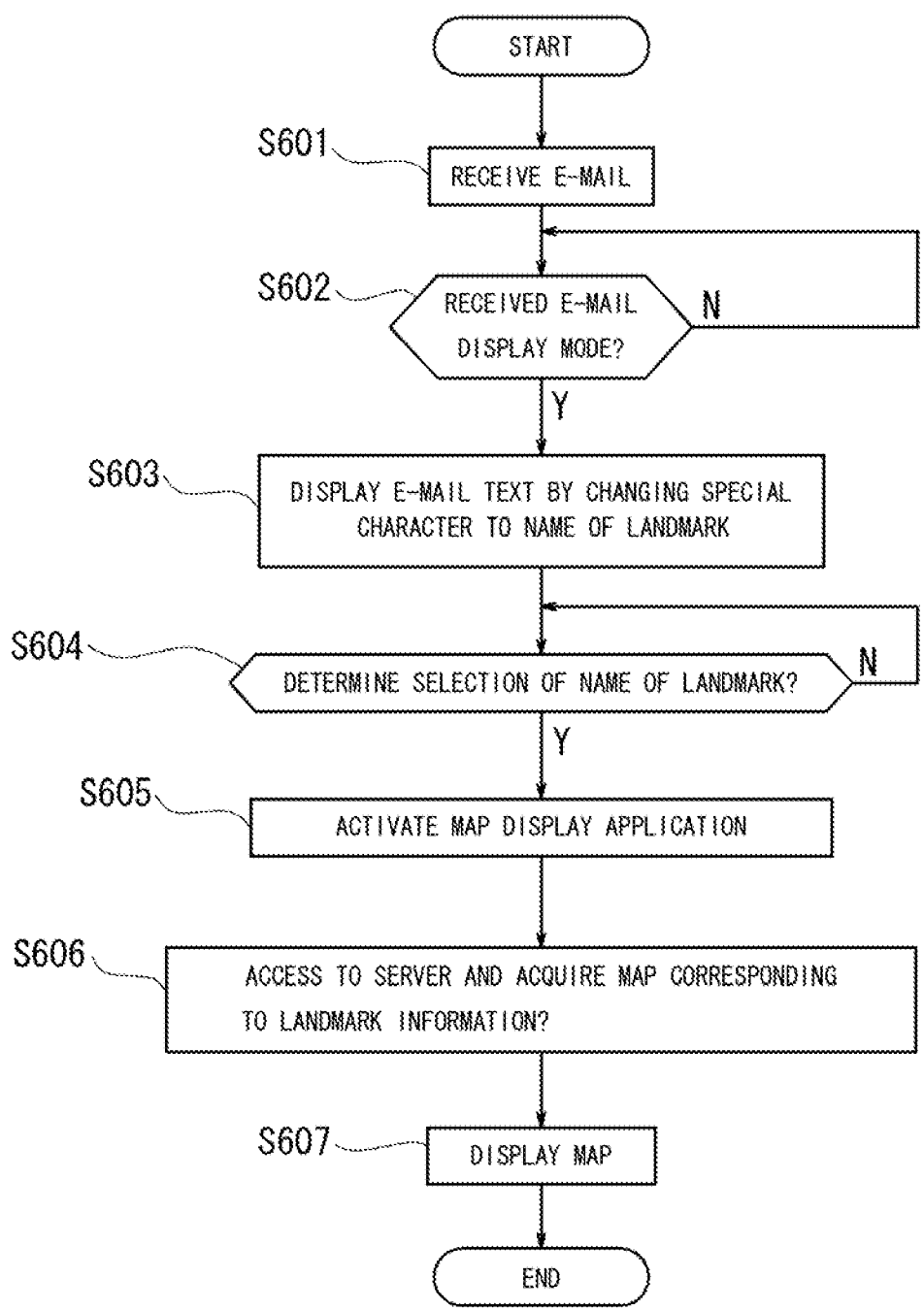
FIG. 17 is a flowchart illustrating operation of a reception side terminal in accordance with a fourth embodiment.
Figure 18:
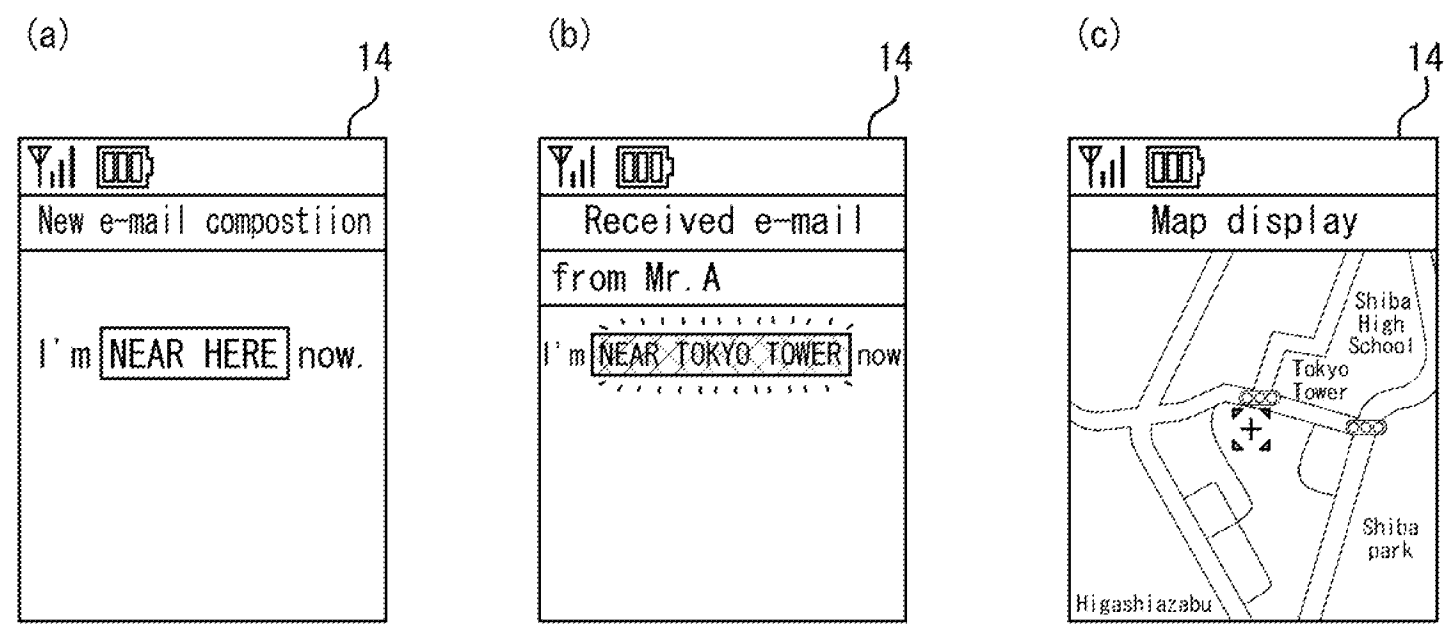

The operation of the cellular phone 10, which is a reception side terminal, in accordance with the present embodiment at the time of reception of an e-mail is explained below with reference to a flowchart in FIG. 17 and examples of a display screen in FIG. 18.

The cellular phone 10 receives an e-mail transmitted from the transmission side terminal and stores the e-mail in the storage unit 24 at step S601, and when being shifted to the received e-mail display mode at step S602, reads out the content of the e-mail from the storage unit 24 and displays it on the display unit 14 at step S603. At this time, when the e-mail to be displayed includes the predetermined special character ("NEAR HERE"), among the landmark information that is associated with the special character, the name of the landmark is read out from the storage unit 24 and displayed as a special character. The name of the landmark is displayed in a state of being selected by the display selection area. Hereinafter explanation is given on the assumption that a received e-mail includes a predetermined special character.

By the process as above, the transmission side terminal transmits an e-mail simply by adding a special character, "NEAR HERE", to the e-mail as shown in FIG. 18(a), and when the e-mail is received by the reception side terminal and displayed on the display unit 14, as shown in FIG. 18(b), the special character is displayed as a name of the landmark in a state of being selected by the display selection area from the beginning.

Thereafter, at step S604, when the user pushes the determination key of the input unit 12, for example, to determine the display selection area while the name of the landmark is selected, the map display application is activated (step S605). Subsequently, the address information of the landmark among the landmark information is transmitted from the communication unit 20 to the external server (not shown) through the base station (not shown). The external server selects map information corresponding to the address information of the landmark and replies with the map information to the cellular phone 10. The cellular phone 10 acquires the map information with the communication unit 20 (step S606) and, as shown in FIG. 18(c), for example, displays a map showing the location of the landmark near the transmission side terminal on the display unit 14 using the map display application (step S607). In this case, in the same manner as described in the first embodiment, the scale and the range of the map to be displayed may be adjusted depending on the location relationship between the transmission side terminal and the reception side terminal.

In this manner, in the present embodiment, the user of the transmission side terminal can convey the landmark near his/her present location to the corresponding party at the time of e-mail transmission processing simply by performing operation to add a predetermined special character when composing a normal e-mail. On the other hand, the user of the reception side terminal can know the name of the landmark near the present location of the corresponding party at the moment when the received e-mail is displayed, and see a map around the landmark through a simple operation.

If no landmark exists around (No at step S407 in FIG. 14) when the transmission side terminal transmits an e-mail, the landmark information is not transmitted from the transmission side terminal and the address information of the transmission side terminal is transmitted. In that case, the same processing as that of the second embodiment is performed thereafter, and a part of the address of the present location of the transmission side terminal is displayed, and a map around the address is displayed.

(Fifth Embodiment)

Next, the cellular phone 10 in accordance with a fifth embodiment of the present invention is described. In the present embodiment, when the user wants to convey his/her present location to the corresponding party, the user can transmit the information of the nearest station to his/her present location to the corresponding party by adding a predetermined special character to an e-mail. In the present embodiment, since both terminals on transmission and reception sides can have the same configuration as that of the cellular phone 10 described above, the same descriptions as those of the above embodiment are omitted. In addition, since the operation of the terminals on transmission and reception sides are almost the same as that of the each embodiment described above, only the different points are mainly described and the same descriptions as those described above are appropriately omitted.

Figure 19:
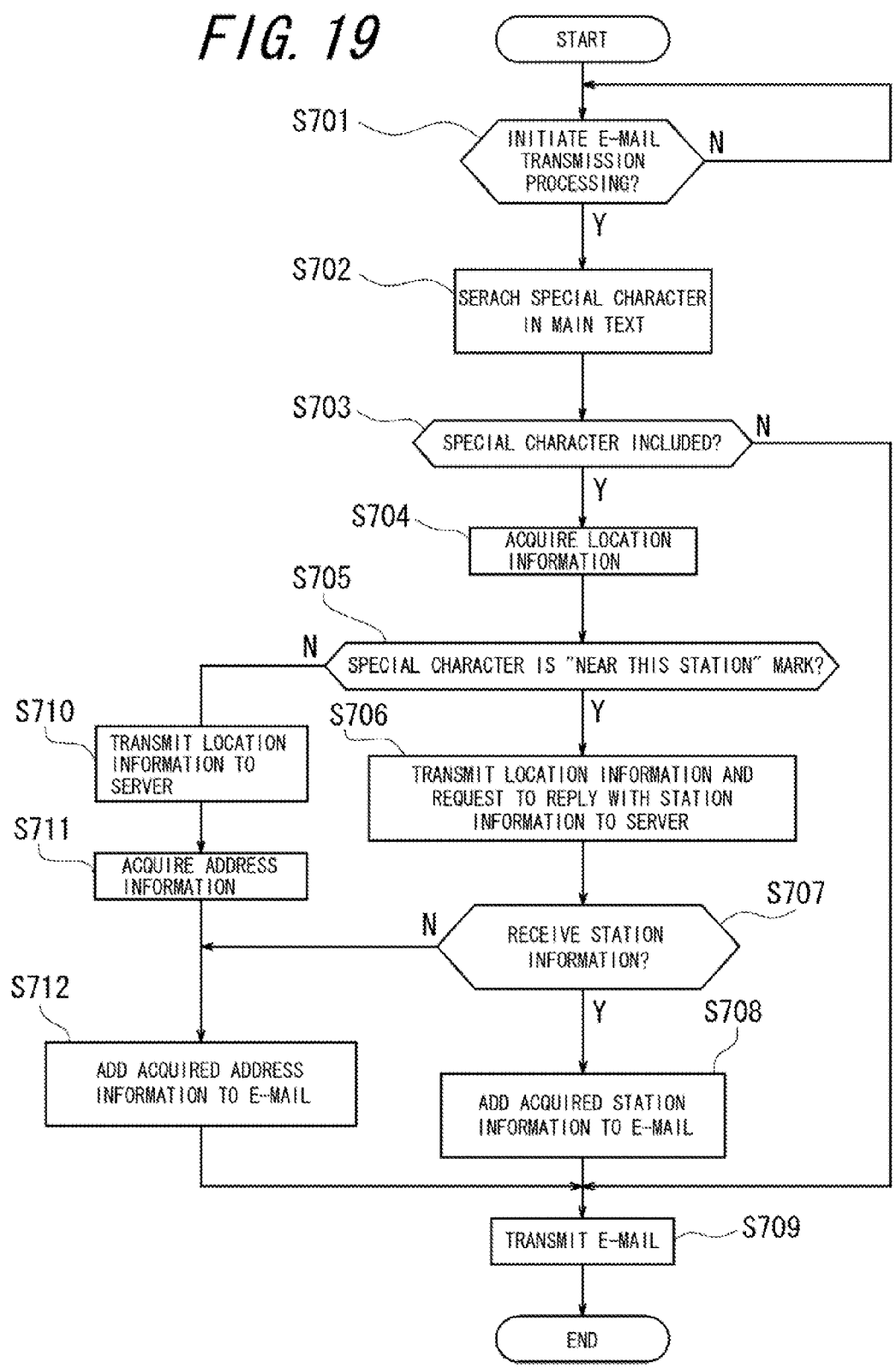
FIG. 19 is a flowchart illustrating operation of a transmission side terminal in accordance with a fifth embodiment.

The operation of the cellular phone 10 in accordance with the present embodiment at the time of transmission of an e-mail is described below with reference to a flowchart in FIG. 19. With the cellular phone 10 of the transmission side terminal in accordance with the present embodiment, the user adds a predetermined special character to an e-mail to transmit when the user wants to convey his/her present location to the recipient of the e-mail. Here, for convenience of explanation, a pictorial symbol depicting "NEAR THE STATION", for example, is the predetermined special character. The user inputs the special character by selecting among various special characters or the like in the special character input mode and inputs letters that are used for a normal e-mail before and after the predetermined special character, thereby composing an e-mail saying 'I'm "NEAR THE STATION" now'.

When the e-mail transmission process is initiated at step S701 after an e-mail is composed, the cellular phone 10 searches the predetermined special character ("NEAR THE STATION") in the e-mail text when encoding the data of the e-mail (step S702).

When the cellular phone 10 detects that the e-mail to transmit includes the predetermined special character at step S703, the GPS processing unit 22 acquires the location information by the GPS as the present location of the cellular phone 10 (step S704). In this case, the location information by the GPS is acquired not only when the detected predetermined special character is the special character of the aforementioned "NEAR THE STATION", but also when the special character, for example, "HERE" described in the first and second embodiment, is detected.

Then, the cellular phone 10 determines whether or not the predetermined special character detected at step S703 is the special character of the "NEAR THE STATION" (step S705). In the case where the detected special character is "NEAR THE STATION", the cellular phone 10 transmits the location information acquired by the GPS to the external server with a request to reply with the station information (step S706).

The external server searches, from the location information based on the GPS that has been transmitted, information on the nearest station that locates, for example, within a radius of 1 km from the location, and when such station exists, replies with the information of the nearest station including the name of the station to the cellular phone 10. In the case where such station does not exist around, the external server replies with the address information corresponding to the location information of the transmission side terminal. The external server defines, for example, based on the environmental setting of the terminal by the user of the transmission side terminal, the target range of search in which the nearest station is selected and the like, and performs the search based on the definition.

When the communication unit 20 of the cellular phone 10 of the transmission side terminal can receive the information of the nearest station at step S707, the information of the nearest station is added to the data of the e-mail by being associated with the predetermined special character ("NEAR THE STATION") in the e-mail (step S708) and then encoded. Thereafter, the e-mail to which the information of the nearest station is added is transmitted (step S709).

On the other hand, when the special character of "NEAR THE STATION" is not detected in the special characters in the e-mail at step S705, as in the case of the first and second embodiments, the cellular phone 10 acquires the address information of its own terminal (step S711) by transmitting the location information to the external server (step S710), then adds the address information to the e-mail by associating it with the special character (step S712), and transmits them (step S709).

At step S707, when the address information of the transmission side terminal is transmitted from the external server for the reason that no station exists around the transmission side terminal, for example, the address information is added to the e-mail by being associated with the special character (step S712) and then transmitted (step S709). In this case, it is preferable that the special character to be transmitted is changed from "NEAR THE STATION" to "HERE" at step S712.

When no special character is detected in the e-mail to be transmitted at step S703, a normal e-mail to which no location information of its own terminal is added is transmitted.

In this manner, in the present embodiment, the user who wants to convey his/her present location to the corresponding party can transmit the information of the nearest station to the present location based on the accurate present location of the user using the GPS information only by performing operation to add a predetermined special character when composing a normal e-mail. Therefore, it is advantageous particularly in a situation where the user should refrain from talking on a phone such as traveling by train or the like.

Next, operation of the cellular phone 10 in accordance with the present embodiment at the time of reception of an e-mail is described with reference to a flowchart in FIG. 20 and examples of a display screen in FIG. 21. In the present embodiment, when receiving an e-mail including a predetermined special character ("NEAR THE STATION") from the transmission side terminal, the cellular phone 10, the reception side terminal, displays the name of the nearest station to the location of the transmission side terminal in response to the selection of the special character that is displayed. Moreover, the cellular phone 10 displays a route search result from the station to the nearest station of the reception side terminal in response to the determination of the selection of the special character.

Since the operation of the cellular phone 10, which is a reception side terminal, in accordance with the present embodiment is, on the whole, the same as that in accordance with the third embodiment, overlapped descriptions are appropriately omitted.

The cellular phone 10 receives the e-mail transmitted from the transmission side terminal and stores the e-mail in the storage unit 24 at step S801, and when being shifted to the received e-mail display mode at step S802, reads out the content of the e-mail from the storage unit 24 and displays it on the display unit 14 at step S803 in the same manners as those of the third embodiment. Here, explanation is given below on the assumption that the received e-mail includes a predetermined special character.

After the e-mail text is displayed at step S803, it is determined whether or not the predetermined special character included in the e-mail text is selected by the display selection area based on the user's operation (step S804). FIGS. 21(*a*) and 21(*b*) sequentially show a state where the display selection area is moved by the user's operation, for example, from the display part of the sender (From column) to the special character of "NEAR THE STATION" in the e-mail text. In this manner, when the predetermined special character is selected, the nearest station information of the transmission side terminal is read out from the storage unit 24 and, among the nearest station information, the name of the station, for example, is popped up near the pictorial symbol of "NEAR THE STATION", which is the predetermined special character, on the display unit 14 (step S805), as shown in FIG. 21(*c*). At this point of time, the predetermined special character (the pictorial symbol of "NEAR THE STATION") has been selected by the display selection area, but has not been determined yet.

Subsequently, at step S806, when the user pushes the determination key of the input unit 12 to determine the display selection area selecting the special character of "NEAR THE STATION", the route search application is activated (step S807). The route search application searches, if the user wants to know the route and required time from station A to station B, for example, and inputs names of both stations and the present time, possible candidate routes and displays the required time and the expected arrival time calculated from the present time and the like for each selected route. The route search by use of this application is a known technique described, for example, in Japanese Patent Application Laid-Open Nos. 8-263786 and 2003-323518, and therefore the detailed explanation thereof is omitted.

Subsequently, the control unit 26 controls the GPS processing unit 22 to acquire, as the present location of the cellular phone 10, the location information based on the GPS (Step S808). Further, the control unit 26 controls the communication unit 20 to transmit the location information of the reception side terminal based on the GPS, the nearest station information of the transmission side terminal and the time information at transmission of an e-mail (the header information of the sending mail) to the external server (not shown) through the base station (not shown).

The external server first searches, as in the case of the transmission side terminal, the nearest station to the reception side terminal from the location information of the reception side terminal based on the GPS and acquires the nearest station information of the reception side terminal. Next, the external server searches candidate routes between the stations based on the nearest station information of the reception side terminal and the nearest station information of the transmission side terminal. Further, the external server calculates the required time and the expected arrival time when the user travels from the nearest station of the transmission side terminal to the nearest station of the reception side terminal in accordance with the searched route based on the time information when the transmission side terminal transmits an e-mail to the reception side terminal, and replies with the result to the cellular phone 10, which is the reception side terminal. The cellular phone 10, the reception side terminal, acquires the information including the search result of the route from the external server (step S809), and as shown in FIG. 21(d), for example, displays the route search result on the display unit 14 using the route search application (step S810).

In this manner, in the present embodiment, the user who carries the reception side terminal can know, when he/she receives an e-mail that an e-mail sender has transmitted by adding the predetermined special character, the nearest station to the present location of the sender at the moment when the sender transmitted the e-mail. Moreover, the user can know the candidate routes and required time from the nearest station of the transmission side terminal to his/her nearest station and the expected arrival time when the user who carries the transmission side terminal travels by train. Therefore, in the present embodiment, the communication unit 20 serves as a route information acquisition unit.

Figure 20:
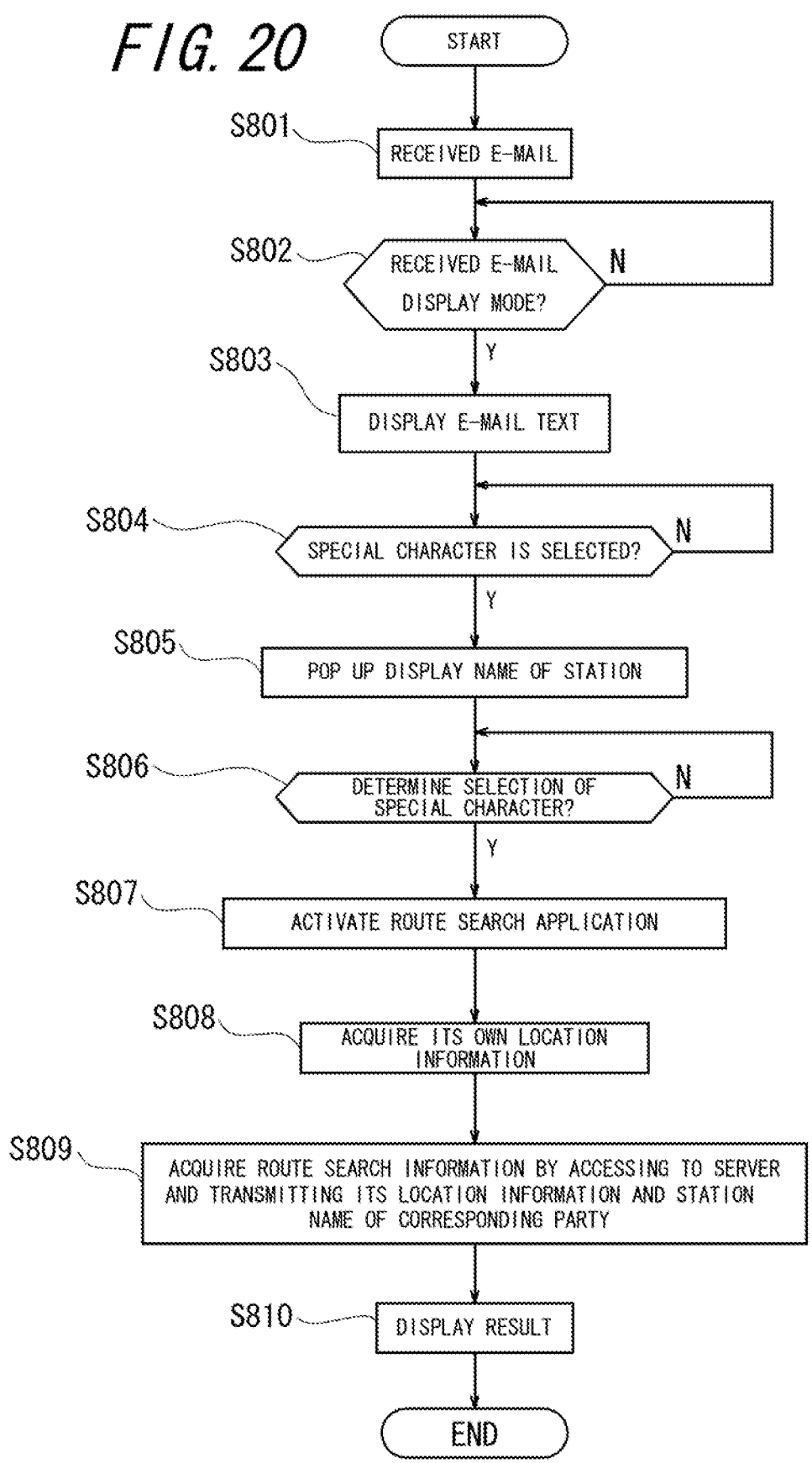
FIG. 20 is a flowchart illustrating operation of a reception side terminal in accordance with the fifth embodiment.
Figure 21:
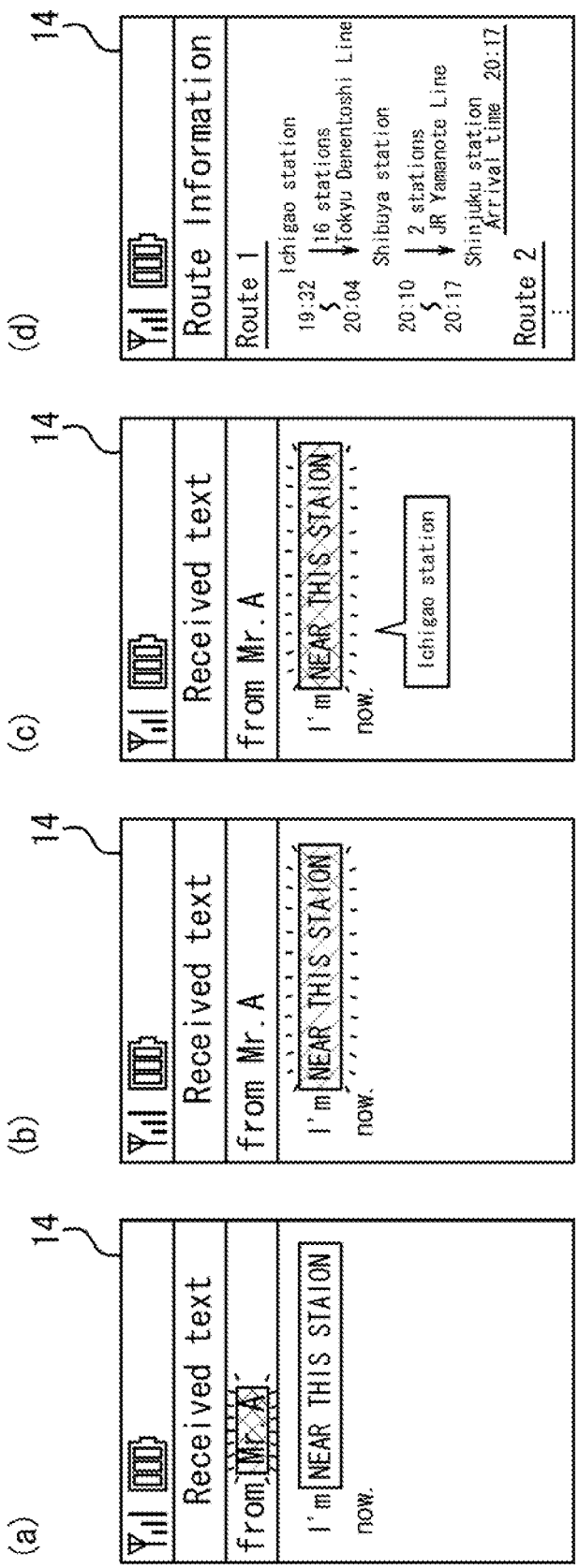
FIG. 21 is a diagram showing examples of display on a screen of a display unit of the reception side terminal in accordance with the fifth embodiment.

In the present embodiment, as in the case of the alternative described in the first embodiment, steps S804 and S805 of FIG. 20 may be omitted, thereby further facilitating the user's operation and displaying the route search result immediately. In this case, the cellular phone 10 that has received an e-mail displays, when the user performs operation to display the received e-mail, the screen as shown in FIG. 21(b), for example, on the display unit 14 from the beginning. Further, when the user pushes the determination key to determine selection of the display selection area, the screen shown in FIG. 21(d) is displayed.

When no station exists around when the transmission side terminal transmits an e-mail (No at step S707 in FIG. 19), the information on the nearest station is not transmitted by the transmission side terminal and the address information of the transmission side terminal is transmitted. In that case, the same process as that of the first embodiment is performed thereafter and the address of the present location of the transmission side terminal is displayed, and a map around the address is further displayed.

(Sixth Embodiment)

Next, explanation of the cellular phone 10 in accordance with a sixth embodiment of the present invention is given. In the present embodiment, the cellular phone 10 of the transmission side terminal operates in the same manner as that of the fifth embodiment. On the other hand, the cellular phone 10 of the reception side terminal operates in the almost same manner as that of the second embodiment. However, the information to be processed is not the address information of the present location of the sender, but the nearest station to the present location of the sender.

Specifically, the cellular phone 10, the transmission side terminal, acquires the nearest station information based on the location information of its own terminal at the time of transmission of an e-mail including a predetermined special character and transmits the nearest station information with an e-mail. On the other hand, when receiving the e-mail including the predetermined special character from the transmission side terminal, the cellular phone 10, the reception side terminal, displays the special character by changing it to the name of the nearest station when displaying the e-mail text. Further, when the selection of the display is determined, the cellular phone 10 displays a search result of the route from the station to the nearest station to the reception side terminal. Since the operation of the cellular phone 10, the transmission side terminal, is the same as that of the fifth embodiment, explanation thereof is omitted.

Figure 22:
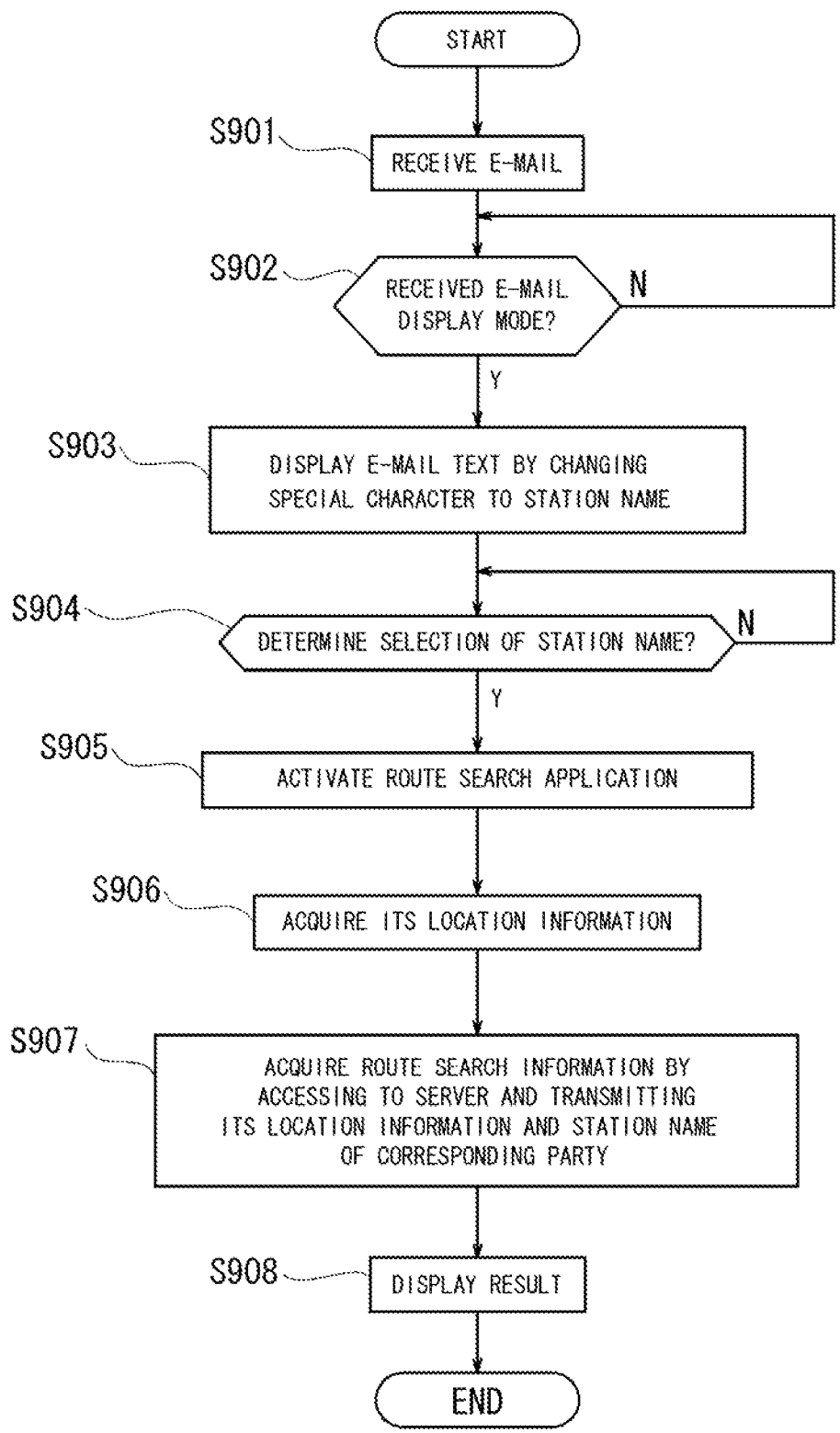
FIG. 22 is a flowchart illustrating operation of a reception side terminal in accordance with a sixth embodiment.

The operation of the cellular phone 10, which is a reception side terminal, in accordance with the present embodiment at the time of reception of an e-mail is explained below with reference to a flowchart in FIG. 22 and examples of a display screen in FIG. 23.

The cellular phone 10 receives an e-mail transmitted from the transmission side terminal and stores the e-mail in the storage unit 24 at step S901, and when being shifted to the received e-mail display mode at step S902, reads out the content of the e-mail from the storage unit 24 and displays it on the display unit 14 at step S903. At this time, when the e-mail to be displayed includes the predetermined special character ("NEAR THE STATION"), the name of the nearest station among the nearest station information that is associated with the special character is read out from the storage unit 24 and displayed as a special character. The name of the nearest station is displayed in a state of being selected by the display selection area. Hereinafter explanation is given on the assumption that a received e-mail includes a predetermined special character.

By such process, the transmission side terminal simply adds a special character of "NEAR THE STATION" to an e-mail as shown in FIG. 23(a) and transmits them, and when the reception side terminal receives the e-mail and displays it on the display unit 14, the special character is displayed as a name of the nearest station from the beginning and in a state of being selected by the display selection area as shown in FIG. 23(b).

Thereafter, at step S904, when the user pushes the determination key of the input unit 12 or the like to determine the display selection area selecting the name of the nearest station, the route search application is activated (step S905).

Subsequently, the GPS processing unit 22 acquires the location information based on the GPS as the present location of the cellular phone 10 (step S906). Further, the communication unit 20 transmits the location information of the reception side terminal based on the GPS, the nearest station information of the transmission side terminal and the time information at transmission of the e-mail to the external server (not shown) through the base station (not shown).

The external server first searches the nearest station to the reception side terminal from the location information of the reception side terminal based on the GPS and acquires the nearest station information of the reception side terminal. Next, the external server searches candidate routes between both stations based on the nearest station information of the reception side terminal and the nearest station information of the transmission side terminal. Further, the external server calculates the required time and the expected arrival time when the user travels from the nearest station of the transmission side terminal to the nearest station of the reception side terminal according to the searched route based on the time information when the transmission side terminal transmitted the e-mail to the reception side terminal, and replies with the result to the cellular phone 10, which is the reception side terminal. The cellular phone 10, the reception side terminal, acquires the information of the search result of the route and the like from the external server (step S907) and, for example, as shown in FIG. 2(c), displays the search result of the route on the display unit 14 using the route search application (step S908).

In this manner, in the present embodiment, the user of the transmission side terminal can convey the nearest station to his/her present location at the time of transmission of an e-mail to the corresponding party simply by performing operation to add the predetermined special character when composing a normal e-mail. In addition, the user of the reception side terminal can know the name of the nearest station to the present location of the corresponding party at the moment when the received e-mail is displayed. Moreover, the user of the reception side terminal can know candidate routes and the required time from the nearest station of the transmission side terminal to his/her nearest station and the expected arrival time of the user of the transmission side terminal through a simple operation.

In addition, in a case where no station exists around when the transmission side terminal transmits an e-mail (No at step S707 in FIG. 19), the station information is not transmitted from the transmission side terminal and the address information of the transmission side terminal is transmitted. In that case, the same process as that of the second embodiment is performed thereafter, and a part of address of the present location of the transmission side terminal can be displayed and further, a map around the address can be displayed.

The present invention is not limited to the above embodiments, and many variations and modifications can be implemented. For example, in each embodiment described above, the cellular phone 10, the transmission side terminal, converts the location information of its own terminal acquired by the GPS processing unit 22 into the address information through access to the external server before transmitting an e-mail. However, the location information by the GPS may be transmitted by being added to the e-mail without being converted into the address information on the transmission side, and the location information by the GPS may be converted into the address information by the cellular phone 10 on the reception side that receives the e-mail through appropriate connection to the external server.

In addition, in each embodiment described above, when the location information by the GPS is converted into the address information, an external server is accessed and the conversion processing is performed by the server. However, the information that correlates the location information by the GPS with the address information may be stored previously in the storage unit 24 of the transmission side or the reception side terminal so that the conversion processing into the address information can be performed by each terminal without accessing to the external terminal. As in the case of the address information, the map information (data for creating a map) may be stored previously in the storage unit 24 of the terminal so that a map can be created based on the location information by the GPS or the address information with reference to the storage unit 24 of the terminal without accessing to the external server.

Further, in each embodiment described above, the location information of its own terminal is acquired by receiving radio waves from the GPS satellite. However, acquisition of the location information is not limited to use of the GPS, but it is possible to estimate the location information of its own terminal based on the location information of the base station that can be identified based on the base station ID that is included in the information received through communication with the base station. By using the location information by the GPS with the location information of the base station, when the location information by the GPS cannot be acquired, it is possible to estimate the location information of its own terminal by use of the location information of the base station.

Moreover, in the specification, although each special character is described individually in each embodiment, the embodiments may be combined so that special characters can be used in one terminal. In other words, it is possible to select a special character at the user's discretion depending on the situation such as a case where the user wants to transmit the address of his/her present location, a case where the user wants to transmit a neighboring landmark, a case where the user wants to inform the nearest station or the like.

Industrial Applicability

According to the present invention, a terminal on a transmission side adds a acquired present location information of its own terminal to an e-mail to be transmitted by being associated with a predetermined special character that is included in the e-mail and transmits the e-mail, thereby enabling transmission of the location of its own terminal to a corresponding party quickly and in a manner easy to understand through a simple operation. Further, when the predetermined special character included in a received e-mail is selected and determined, a terminal on a reception side displays the information based on the location information of the transmission side terminal, thereby enabling display of the present location of the transmission side terminal and the additional information based thereon to be recognized easily.

The invention claimed is:

1. A mobile terminal comprising:
a transmission unit for transmitting an e-mail;
a location information acquisition unit for acquiring location information of the mobile terminal; and
a control unit for controlling so that, when an e-mail to be transmitted includes a predetermined special character at transmission processing of the e-mail, the location information acquisition unit acquires the location information of the mobile terminal in response to an input operation to initiate the transmission processing of the e-mail, and the acquired location information is added to the e-mail to be transmitted by being associated with the special character and the added e-mail is transmitted by the transmission unit, wherein the control unit adds the acquired location information to the e-mail.

2. The mobile terminal according to claim 1, wherein when the predetermined special character is included at encoding of data of an e-mail to be transmitted, the control unit controls the location information acquisition unit to acquire the location information of the mobile terminal.

3. The mobile terminal according to claim 2, wherein the control unit controls the location information acquisition unit to acquire information on an address of a location of the mobile terminal as the location information.

4. The mobile terminal according to claim 2, wherein the control unit controls the location information acquisition unit to acquire information on a nearest landmark to a location of the mobile terminal as the location information.

5. The mobile terminal according to claim 2, wherein the control unit controls the location information acquisition unit to acquire information on a nearest station to a location of the mobile terminal as the location information.

6. The mobile terminal according to claim 1, wherein the control unit controls the location information acquisition unit to acquire information on an address of a location of the mobile terminal as the location information.

7. The mobile terminal according to claim 1, wherein the control unit controls the location information acquisition unit to acquire information on a nearest landmark to a location of the mobile terminal as the location information.

8. The mobile terminal according to claim 1, wherein the control unit controls the location information acquisition unit to acquire information on a nearest station to a location of the mobile terminal as the location information.

9. A mobile terminal comprising:
a reception unit for receiving an e-mail;
a display unit for displaying the e-mail received by the reception unit;
a storage unit for storing, with the e-mail, location information of a transmission side terminal of the e-mail that is acquired by the transmission side terminal in response to an input operation to initiate transmission processing of the e-mail, and that is added by being associated with a predetermined special character included in the e-mail; and
a control unit for controlling the display unit to display information based on the location information of the transmission side terminal stored in the storage unit when displaying the e-mail, wherein the transmission side terminal adds the location information to the e-mail.

10. The mobile terminal according to claim 9, wherein the control unit controls the display unit to display the location information of the transmission side terminal when the predetermined special character displayed on the display unit is selected.

11. The mobile terminal according to claim 10, further comprising a map information acquisition unit for acquiring map information corresponding to location information, wherein the control unit, in response to an input to select and determine the predetermined special character displayed on the display unit, controls the map information acquisition unit to acquire map information corresponding to the location information of the transmission side terminal and the display unit to display the acquired map information.

12. The mobile terminal according to claim 9, wherein the control unit controls so that the special character is converted to the location information of the transmission side terminal and the location information is displayed.

13. The mobile terminal according to claim 12, further comprising a map information acquisition unit for acquiring map information corresponding to location information, wherein the control unit, in response to an input to select and determine the predetermined special character displayed on the display unit, controls the map information acquisition unit to acquire map information corresponding to the location information of the transmission side terminal and the display unit to display the acquired map information.

14. The mobile terminal according to claim 12, wherein when the location information of the transmission side terminal is address information, the control unit controls so that the special character is converted to a part of the address information and the part of the address information is displayed.

15. The mobile terminal according to claim 14, further comprising a map information acquisition unit for acquiring map information corresponding to location information, wherein the control unit, in response to an input to select and determine the predetermined special character displayed on the display unit, controls the map information acquisition unit to acquire map information corresponding to the location information of the transmission side terminal and the display unit to display the acquired map information.

16. The mobile terminal according to claim 14, further comprising a location information acquisition unit for acquiring location information of the mobile terminal, wherein the control unit controls display of the address information of the transmission side terminal depending on the location information of the mobile terminal acquired by the location information acquisition unit and the address information of the transmission side terminal.

17. The mobile terminal according to claim 16, further comprising a map information acquisition unit for acquiring map information corresponding to location information, wherein the control unit, in response to an input to select and determine the predetermined special character displayed on the display unit, controls the map information acquisition unit to acquire map information corresponding to the location information of the transmission side terminal and the display unit to display the acquired map information.

18. The mobile terminal according to claim 9, further comprising a map information acquisition unit for acquiring map information corresponding to location information, wherein the control unit, in response to an input to select and determine the predetermined special character displayed on the display unit, controls the map information acquisition unit to acquire map information corresponding to the location information of the transmission side terminal and the display unit to display the acquired map information.

19. The mobile terminal according to claim 18, further comprising a location information acquisition unit for acquiring location information of the mobile terminal, wherein the control unit controls acquisition of the map information by the map information acquisition unit so that a map having a scale depending on the location information of the mobile terminal acquired by the location information acquisition unit and the address information of the transmission side terminal is displayed.

20. A mobile terminal comprising:
a reception unit configured to receive an e-mail;
a display unit configured to display the e-mail received by the reception unit;

a location information acquisition unit configured to acquire location information of the mobile terminal;

a route information acquisition unit;

a storage unit configured to store, with the e-mail, a first information on a nearest station to a location of a transmission side terminal that is acquired by the transmission side terminal in response to an input operation to initiate transmission processing of the e-mail, and that is added by being associated with a predetermined special character included in the e-mail; and a control unit configured to control the display unit to display the predetermined special character in a selectable manner when displaying the e-mail, wherein the control unit controls, in response to an input to select the predetermined special character, the location information acquisition unit to acquire a second information on a nearest station to a present location of the mobile terminal, and controls the route information acquisition unit to acquire route information based on the second information acquired and the first information, and the display unit to display the route information, wherein the transmission side terminal adds the first information to the e-mail.

21. The mobile terminal according to claim 20, wherein the control unit controls, when the predetermined special character displayed on the display unit is selected, the display unit to display the first information.

22. The mobile terminal according to claim 20, wherein the control unit controls so that the first information is displayed as the special character.

* * * * *